(12) United States Patent
Flohr et al.

(10) Patent No.: US 8,571,692 B2
(45) Date of Patent: Oct. 29, 2013

(54) METHODS AND COMPUTER PROGRAM PRODUCTS FOR REMOTELY MANAGING POWER DEMAND

(76) Inventors: Daniel P. Flohr, Wilmington, NC (US); Stewart Ramsay, Walnut Creek, CA (US)

( * ) Notice: Subject to any disclaimer, the term of this patent is extended or adjusted under 35 U.S.C. 154(b) by 61 days.

(21) Appl. No.: 13/399,698

(22) Filed: Feb. 17, 2012

(65) Prior Publication Data

US 2012/0203389 A1 Aug. 9, 2012

Related U.S. Application Data

(62) Division of application No. 12/143,074, filed on Jun. 20, 2008, now Pat. No. 8,121,742.

(60) Provisional application No. 60/981,700, filed on Oct. 22, 2007, provisional application No. 60/986,449, filed on Nov. 8, 2007, provisional application No. 60/989,563, filed on Nov. 21, 2007.

(51) Int. Cl.
*G05B 19/18* (2006.01)

(52) U.S. Cl.
USPC ............. 700/65; 700/19; 700/22; 700/286; 700/291; 700/297; 126/615; 236/21 B

(58) Field of Classification Search
USPC .......... 700/19–20, 22, 65–66, 286, 291, 295, 700/297; 126/615, 621–623; 236/21 B; 340/693.3
See application file for complete search history.

(56) References Cited

U.S. PATENT DOCUMENTS

| 4,023,043 | A | * | 5/1977 | Stevenson ...................... 307/38 |
| 4,168,491 | A | | 9/1979 | Phillips et al. |
| 4,360,881 | A | | 11/1982 | Martinson |
| 4,731,547 | A | | 3/1988 | Alenduff et al. |
| 5,572,438 | A | * | 11/1996 | Ehlers et al. .................. 700/295 |
| 6,671,586 | B2 | | 12/2003 | Davis et al. |
| 6,832,135 | B2 | | 12/2004 | Ying |
| 6,972,162 | B2 | | 12/2005 | Gao et al. |
| 7,206,670 | B2 | * | 4/2007 | Pimputkar et al. ............ 700/291 |
| 7,620,302 | B2 | | 11/2009 | Lesage et al. |
| 7,738,999 | B2 | | 6/2010 | Petite |
| 8,234,876 | B2 | * | 8/2012 | Parsonnet et al. ................. 62/59 |
| 2002/0103655 | A1 | * | 8/2002 | Boies et al. ....................... 705/1 |

(Continued)

FOREIGN PATENT DOCUMENTS

| EP | 1 487 079 A2 | 12/2004 |
| EP | 1 993 183 A | 11/2008 |

(Continued)

OTHER PUBLICATIONS

"Energy Legal Blog: ERCOT Identifies Scenarios for Texas Wind Transmission", Bracewell & Giuliani, LLP (2007), 4 pages, Last Download: May 7, 2008.

(Continued)

*Primary Examiner* — Ramesh Patel
(74) *Attorney, Agent, or Firm* — Myers Bigel Sibley & Sajovec, P.A.

(57) ABSTRACT

A method of managing excess electrical power generation may be provided by remotely controlling operation of at least one of two energy storage devices coupled in series at a customer location in response to availability of generated electricity to the customer location.

26 Claims, 23 Drawing Sheets

(56) References Cited

U.S. PATENT DOCUMENTS

| | | | |
|---|---|---|---|
| 2003/0066090 | A1 | 4/2003 | Traw et al. |
| 2003/0187550 | A1 | 10/2003 | Wilson et al. |
| 2004/0153170 | A1* | 8/2004 | Santacatterina et al. ......... 700/1 |
| 2004/0158360 | A1 | 8/2004 | Garland et al. |
| 2004/0257730 | A1 | 12/2004 | Suzuki et al. |
| 2005/0071092 | A1 | 3/2005 | Farkas et al. |
| 2006/0276938 | A1 | 12/2006 | Miller |
| 2008/0039979 | A1 | 2/2008 | Bridges et al. |
| 2008/0039980 | A1 | 2/2008 | Pollack et al. |
| 2008/0039989 | A1 | 2/2008 | Pollack et al. |
| 2008/0040223 | A1 | 2/2008 | Bridges et al. |
| 2008/0040263 | A1 | 2/2008 | Pollack et al. |
| 2008/0040295 | A1 | 2/2008 | Kaplan et al. |
| 2008/0040296 | A1 | 2/2008 | Bridges et al. |
| 2008/0052145 | A1 | 2/2008 | Kaplan et al. |
| 2008/0167756 | A1* | 7/2008 | Golden et al. ............. 700/297 |
| 2008/0272934 | A1* | 11/2008 | Wang et al. ............. 340/870.11 |
| 2009/0093916 | A1* | 4/2009 | Parsonnet et al. ........... 700/286 |
| 2010/0004790 | A1 | 1/2010 | Harbin, III et al. |
| 2012/0271476 | A1* | 10/2012 | Parsonnet et al. ........... 700/295 |

FOREIGN PATENT DOCUMENTS

| | | |
|---|---|---|
| EP | 1 993 183 A1 | 11/2008 |
| WO | WO 2005/041326 A2 | 5/2005 |
| WO | WO 2007/094054 A1 | 8/2007 |

OTHER PUBLICATIONS

"Energy Legal Blog: ERCOT Blames Inaccurate Wind Predictions for February Emergency Event", Bracewell & Giuliani, LLP (2007), 3 pages, Last Download: May 7, 2008.

"Why The Texas Reliability Event on Feb. 26, 2008 Raises No Concerns About Much Higher Wind Penetration", Electric Reliability Council of Texas (ERCOT) and The American Wind Energy Association (AWEA), Full Report found at the following web address: http://interchange.puc.state.tx.us/WebApp/Interchange/Documents/27706_114_577769.pdf.

"Feb. 26, 2008 EECP Step 2 Report: Mar. 18, 2008", ERCOT, 8 pages (2008).

"ERCOT Operations Report on the EECP Event of Feb. 26, 2008", Project No. 27706: Reports of the Electric Reliability Council of Texas (ERCOT) and Public Utility Commission of Texas, 15 pages (2008).

Invitation to Pay Additional Fees and, Where Applicable, Protest Fee (7 pages) corresponding to International Patent Application No. PCT/US2008/011974; Mailing Date: Mar. 6, 2009.

International Search Report and Written Opinion (23 pages) corresponding to International Application No. PCT/US2008/011974; Mailing Date: Jun. 15, 2009.

\* cited by examiner

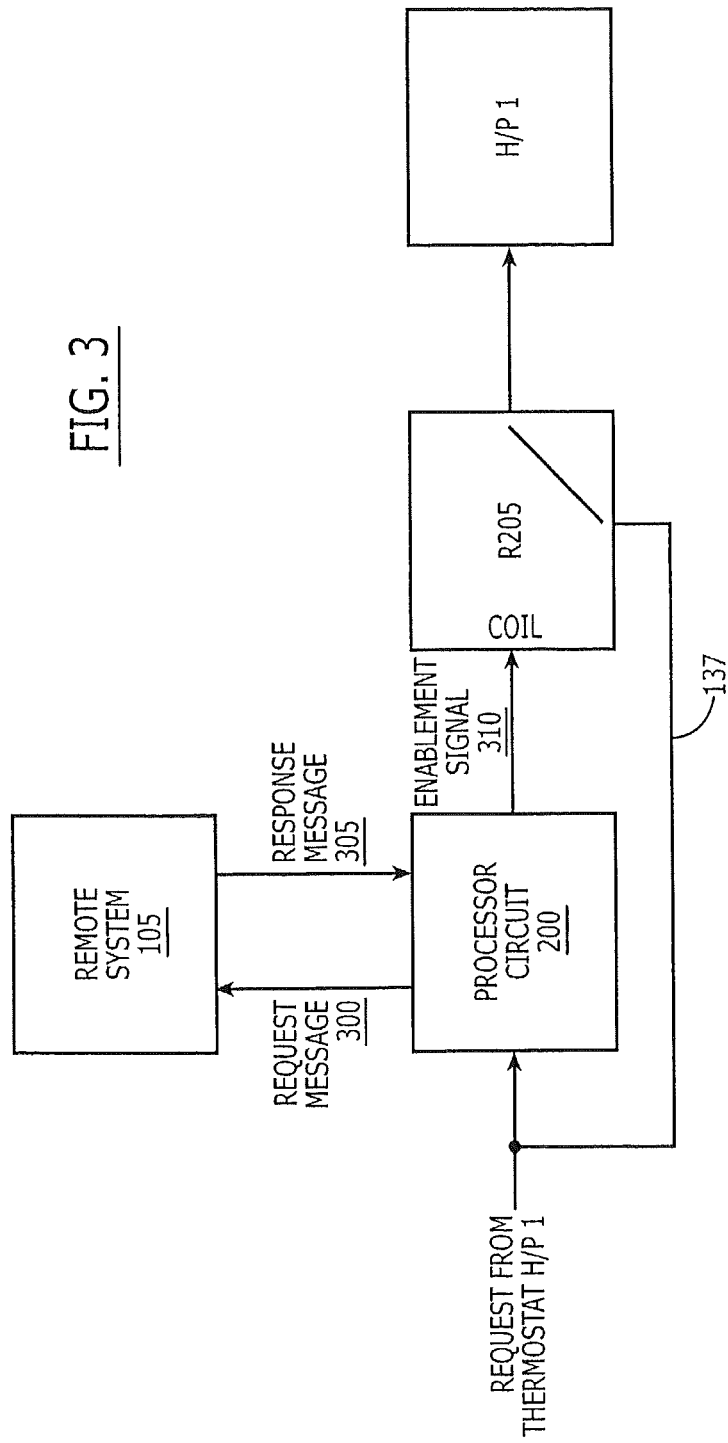

| Supply | | | | |
|---|---|---|---|---|
| Time | Base Plant | Wind | Ref | Randomizer |
| 1 | 4 | 1.8 | 2 | -0.17 |
| 2 | 4 | 3.1 | 3 | 0.11 |
| 3 | 4 | 3.7 | 4 | -0.35 |
| 4 | 4 | 5.4 | 5 | 0.39 |
| 5 | 4 | 4.1 | 4 | 0.09 |
| 6 | 4 | 4.2 | 4 | 0.16 |
| 7 | 4 | 3.0 | 3 | -0.02 |
| 8 | 4 | 4.2 | 4 | 0.18 |
| 9 | 4 | 3.2 | 3 | 0.21 |
| 10 | 4 | 3.6 | 4 | -0.40 |

FIG. 25

| Demand | | | |
|---|---|---|---|
| Time | Demand | Water Heater Demand | # of Water Heaters On-Line |
| 1 | 5 | 0.8 | 1848 |
| 2 | 5.5 | 1.6 | 3576 |
| 3 | 7.5 | 0.2 | 335 |
| 4 | 7 | 2.4 | 5308 |
| 5 | 7.5 | 0.6 | 1311 |
| 6 | 7 | 1.2 | 2573 |
| 7 | 6.5 | 0.5 | 1065 |
| 8 | 7 | 1.2 | 2618 |
| 9 | 6.5 | 0.7 | 1585 |
| 10 | 7 | 0.6 | 1334 |

FIG. 26

| Demand Time | Randomized Demand | Customer Demand | WATER HEATERS Base Water Heaters | Extra Water Heaters | Calculated Water Heater Demand For S/D Balance | TOTAL # of Water Heaters On-Line | LOWERING DEMAND Below Base Demand | Base Demand | RAISING DEMAND Above Base Demand |
|---|---|---|---|---|---|---|---|---|---|
| 1 | 9.0 | 9 | 0.45 | 0.02 | 0.5 | 104,434 | - | 100,000 | 4,434 |
| 2 | 10.5 | 10.5 | 0.33 | - | 0.3 | 72,504 | 72,504 | - | - |
| 3 | 12.3 | 12 | 0.45 | 0.29 | 0.7 | 163,448 | - | 100,000 | 63,448 |
| 4 | 13.7 | 14 | 0.07 | - | 0.1 | 14,748 | 14,748 | - | - |
| 5 | 13.2 | 13 | 0.43 | - | 0.4 | 96,080 | 96,080 | - | - |
| 6 | 14.3 | 14 | 0.45 | 0.25 | 0.7 | 155,372 | - | 100,000 | 55,372 |
| 7 | 15.3 | 15 | 0.45 | 0.25 | 0.7 | 155,921 | - | 100,000 | 55,921 |
| 8 | 12.1 | 12 | 0.35 | - | 0.4 | 78,564 | 78,564 | - | - |
| 9 | 10.1 | 10 | 0.09 | - | 0.1 | 19,776 | 19,776 | - | - |
| 10 | 8.9 | 9 | 0.45 | 0.50 | 0.9 | 210,776 | - | 100,000 | 110,776 |

FIG. 27

METHODS AND COMPUTER PROGRAM PRODUCTS FOR REMOTELY MANAGING POWER DEMAND

CROSS-REFERENCE TO RELATED APPLICATIONS

This application is a Divisional of and claims priority to U.S. patent application Ser. No. 12/143,074, filed Jun. 20, 2008, entitled Methods, Circuits, and Computer Program Products for Generation Following Load Management, now U.S. Pat. No. 8,121,742, and to U.S. Patent Application No. 60/981,700, filed Oct. 22, 2007, entitled Distributed Storage Of Generated Excess Electrical Power, and to U.S. Patent Application No. 60/986,449, Filed Nov. 8, 2007, entitled Adjusting Distributed Storage of Electrical Power Responsive to Changes in Supply and Demand, and to U.S. Patent Application No. 60/989,563, Filed Nov. 21, 2007, entitled Adjusting Distributed Storage of Solar Electrical Power Responsive to Changes in Supply and Demand, and to U.S. patent application Ser. No. 11/753,317, Filed Jun. 26, 2007, entitled Methods, Systems, Circuits and Computer Program Products for Electrical Service Demand Management, which issued as U.S. Pat. No. 7,653,443, the disclosures of which are hereby incorporated herein by reference in their entireties.

FIELD OF THE INVENTION

The invention relates to the field of electrical systems in general, and more particularly, to power systems management.

BACKGROUND

One problem faced by electrical service providers is the peak demand for electricity during certain time periods, such as during extremely hot or cold weather. Traditionally, electrical service providers meet this peak demand by purchasing expensive electricity from the power grid or, in extreme cases reduce service to entire neighborhoods or sectors of a grid, thereby totally eliminating or coarsely reducing the load.

Another approach is to reduce peak demand by eliminating or reducing the demand from some electrical appliances, such as heating units, air conditioners, and/or water heaters, while leaving other devices, such as lights and small appliances, operating normally. Some Electric providers offer programs where they can shut-off water heaters and air conditioners during peak periods. Such an approach, however, can be an inconvenience to some customers, especially if the offered financial incentives are small.

New approaches, such as real-time pricing for industrial customers, is another demand reducing technique where a financial penalty/reward system is offered to customers who can shift load to times where the elect provider can more easily supply it.

If these types of approaches are not effective, the electrical service provider may need to add additional power generation capacity by building new power plants even though the peak demand for power may exceed current capacity by only a small margin.

SUMMARY

Embodiments according to the invention can be used to store generated excess electrical power that might otherwise be stored in less efficient ways or even go un-stored during times when demands on existing electrical power systems is below peak demand. For example, it maybe advantageous to maintain the output of an electrical power plant so that it operates at higher efficiency despite the fact that demand for electricity is below the level that is provided at this higher efficiency. The generated excess electrical power provided by this higher efficiency can be stored at a customer location and used later, when demand may be greater. Storing the generated excess electrical power for later use during higher demand periods may reduce the load during the period of greater demand so that an existing power plant may more readily meet the demand.

Accordingly, in some embodiments according to the invention, a method of managing excess electrical power generation may be provided by remotely controlling operation of at least one of two energy storage devices coupled in series at a customer location in response to availability of generated electricity to the customer location.

BRIEF DESCRIPTION OF THE DRAWINGS

FIG. 3 is a block diagram that illustrates message traffic between a local system processor circuit and a remote system in response to requests to enable/disable the respective electrical appliances by coupling/decoupling power thereto in some embodiments according to the invention.

FIG. 25 is a table that illustrates electrical power generated by the wind farm at different times in some embodiments according to the invention.

FIG. 26 is a table that illustrates a number of water heaters at the customer locations selectively enabled to approximate the total electrical supply available in some embodiments according to the invention.

FIG. 27 is a table that illustrates a number of water heaters remotely enabled as a nominal operating condition so that demand may be adjusted to more readily match supply in some embodiments according to the invention.

DESCRIPTION OF EMBODIMENTS ACCORDING TO THE INVENTION

Figure 1:
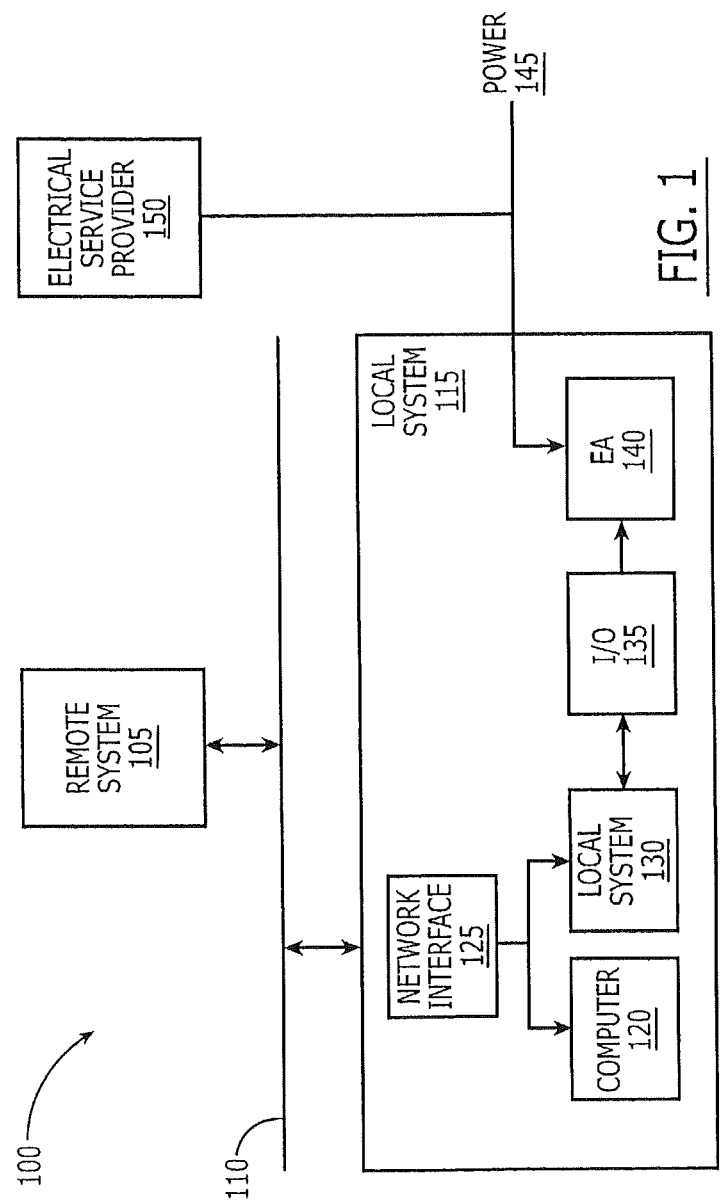
FIG. 1 is a block diagram that illustrates embodiments of systems for demand management in some embodiments according to the invention.

The invention now will be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations according to the present invention may be written in an object oriented programming language such as JAVA®, Smalltalk or C++, JavaScript, Visual Basic, TSQL, Peri, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

It is understood that each block of the illustrations, and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can operate in a logically separated (or physically separated) client side/server side-computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated.

Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser.

The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

As appreciated by the present inventor, the systems described herein can be utilized according to a time-of-use billing system to allow a reduction in demand for electrical service at a customer location. In particular, time-of-use billing systems have been adopted by electrical service providers to encourage customers to shift usage of electrical appliances to "off peak" times. Off peak usage of electrical appliances can be advantageous to electrical service providers as it may reduce the need for the electrical service provider to increase peak power production by, for example, adding capacity to their power generation grid.

As appreciated by those skilled in the art, electrical service providers may not typically store electricity generated at one time for use at a later time. Accordingly, one of the issues faced by electrical service providers is to provide electrical service that can meet the peak demand requirements of the grid that the electrical service provider supplies.

Therefore, in some embodiments according to the invention, the systems, circuits, computer program products, and methods described herein can be used to time shift or otherwise control different electrical appliances to reduce overlapping activation and operating times of those different electrical appliances during a time interval, which is monitored by the electrical service provider for billing under the time-of-use billing arrangement. More specifically, in a time-of-use billing arrangement, the electrical service provider will measure the maximum amount of power used during pre-determined time intervals, such as 15 minute intervals, over a specified period for which the customer is billed (e.g., a month).

Therefore, as appreciated by the present inventor, significant reductions in demand during these time intervals may be achieved by reducing the overlapping activation time of different electrical appliances that are located at a single customer location. For example, in some embodiments according to the invention, two electrical appliances (such as two different heat pumps at a single customer location) can be controlled so that the activation of each of the respective heat pumps is shifted with respect to one another. Accordingly, time shifting the activation of the different heat pumps can reduce the likelihood that both heat pumps are active during the same on-peak time intervals, where the electrical service provider measures the maximum demand for electrical service for the purposes of billing.

These approaches may provide both a cost reduction for the customer as well as the benefit to the electrical service provider by allowing a further reduction in the peak demand capacity required for the grid. In particular, the electrical service provider may further reduce the peak capacity of their power generation as both heat pumps are less likely to be activated at the same time (i.e., during peak demand).

As described hereinbelow in greater detail, reducing the overlapping activation time of different electrical appliances at a single customer location can be provided by, for example, time shifting the activation of the different electrical appliances into different time intervals by manipulating the activation of one or more of the electrical appliances to shift the operation thereof to a time interval when other electrical appliances are disabled. For example, in some embodiments according to the invention, two heat pumps can be run simultaneously (during off peak hours) to determine the rate at which each of the respective heat pumps heats the corresponding living space at the single customer location. The rate at which those respective living spaces cool after the heat pumps are disabled can also be determined. These rates of heating/cooling can be used to determine a time at which one of the heat pumps can be prematurely deactivated so that by the time the respective living space cools to a point where it should be reheated, the other heat pump has heated the other living sufficiently and will switch off. Therefore, the two heat pumps can operate during two different time intervals (with reduced overlapping activation times).

In still other embodiments according to the invention, the heat pumps described above can be controlled to be active during different time intervals by providing respective enablement signals to allow the coupling/decoupling of power to the heat pumps. For example, in some embodiments according to the invention, both heat pumps may request activation, but only one may be enabled for activation (such as the higher priority heat pump) while the other heat pump waits until the higher priority heat pump is allowed to heat the respective living space adequately. Subsequently, the second heat pump can be enabled for activation while the higher priority heat pump is disabled.

In other embodiments according to the invention, the systems, methods, and computer program products described herein can be provided as part of a distributed system including a remote system and a local system (at the single customer location). Accordingly, the local system can receive requests from the different electrical appliances at the single customer location and transmit messages to the remote system via a network. The remote system can respond to the request messages with response messages either granting or denying the requests made by the respective electrical appliances.

The local system can receive the response messages and provide enablement signals to an input/output circuit which can control the coupling/decoupling of power to the respective electrical appliances. For example, in some embodiments according to the invention, a thermostat controlling a heat pump may signal the local system that the living space to which the heat pump is coupled should be heated. The local system can respond by transmitting a message to a remote system which can determine whether the request from the heat pump should be fulfilled while reducing overlapping activation time of different electrical appliances (such as other heat pumps or water heaters located at the same customer location which may be currently on or may later request activation).

If the remote system determines that the request from the heat pump should be fulfilled, the remote system can transmit a response message to the local system indicating that the local system should enable the heat pump for activation. Upon receiving the response message, the local system can assert an enablement signal to an input/output circuit associated with the heat pump. The enablement signal can control the respective input/output circuit to couple electrical power from the electrical service provider to the heat pump. Accordingly, the determinations of which electrical appliances should be enabled for activation and which electrical appliances should be disabled for activation can be determined by the remote system.

FIG. 1 is a block diagram that illustrates local and remote systems for reducing overlapping activation times of different electrical appliances at a single customer location in some embodiments according to the invention. As shown in FIG. 1, a system 100 can include both a local system 115 and a remote system 105, which can communicate with one another over a network 110. It will be understood that the network 110 can be any type of communications network that allows messaging between the local system 115 and the remote system 105. For example, the network 110 can be the Internet, an Intranet, a public switched telephone network, or a wireless communications network. The network 110 can also be a combination of these components.

The remote system 105 can provide a demand management server which can make determinations of when different electrical appliances located at the single customer location should be enabled/disabled to reduce overlapping activation times. In particular, the demand management server can make the determinations of which electrical appliances are to be enabled/disabled based on, for example, messages received from the local system 115, that indicate which electrical appliances are requesting activation.

The demand management sever can be controlled by a user (such as the customer associated with a single customer location) via an interface so that the user can customize the controls provided to the demand management server to reduce the overlapping activation times. For example, the demand management server can allow the user to specify a comfort level for the single customer location where a higher comfort level allows the demand management server to increase overlapping activation times to increase the relative comfort of the environment at the single customer location. In contrast, a lower comfort setting can indicate that the demand management server can be more aggressive by further reducing the overlapping activation times to make the environment relatively less comfortable in the interest of allowing reductions in the cost of the electrical service provided to the single customer location.

It will be understood that the interface to the demand management server can be accessed via a computer 120 associated with the single customer location. It will be understood that the computer 120 can be any computer whether located at the single customer location or remote therefrom. For example, the computer 120 can actually be a computer system located in a different city than the single customer location so that the user can adjust the settings used by the demand management server while the customer is traveling for an extended period of time. Alternatively, the computer 120 can be located at the single customer location. In still other embodiments according to the invention, the computer 120 can actually be a system which is less capable than a general purpose computer system, such as a telephone, or other electronic device which can still provide an interface to the demand management server.

As further shown in FIG. 1, the computer 120 can access the network 110 through a network interface circuit 125 (such as a router/cable modem) typically provided by a broadband service to allow access for the computer 120 to the Internet. In other words, in some embodiments according to the invention, the communication between the local system 115 and the remote system 105 (as well as the computer 120) can be provided by a standard broadband connection to the Internet.

As further shown in FIG. 1, the local system 115 includes a local processor circuit 130 connected to the network interface circuit 125 and an input/output (I/O) circuit 135. The local processor circuit 130 can operate to receive requests from electrical appliances requesting activation. For example, the local processor circuit 130 can receive signals from thermostats associated with heat pumps, air conditioners, etc. that would otherwise activate the respective electrical appliances without any further intervention. However, in some embodiments according to the invention, the request from the respective electrical appliance is provided to the local processor circuit 130. The local processor circuit 130 can then formulate messages for transmission to the remote system 105 via the network 110 indicating that the respective electrical appliance is requesting activation.

If the remote system 105 determines that the requesting electrical appliance is to be enabled for activation, a response message 105 can be transmitted to the local processor circuit 130, whereupon the local processor circuit 130 can assert an enablement signal to the input/output circuit 135 to couple electrical power 145 provided by an electrical service provider 150 to an electrical appliance 140.

It will be understood that the electrical service provider can be an electric utility company which owns and operates large scale power generating plants for delivery to the power grid to which the single customer location is connected. However, it will be understood that the electrical service provider 150 can be any entity that provides electrical service to the single customer location and is not necessarily limited to those entities that own and operate electrical power generation facilities.

It will be further understood that although the determinations described herein to reduce the overlapping activation of different electrical appliances located at a single customer location are described as being made the demand management server at the remote system 105, in some embodiments according to the invention, some or part of the determinations can be made by the local system 115. For example, in some embodiments according to the invention, the local system 115 can operate independent of the remote system 105 when the local system 115 is unable to communicate with the remote system 105. For example, during periods when the network 110 is out of operation, the local system 115 may operate the electrical appliances 140 based on a simple set of rules that are stored locally for access by the local processor circuit 130.

In some embodiments according to the invention, the Ideal processor circuit 130 may access a nonvolatile memory system that stores instructions for the local processor circuit 130 which, when executed by the local processor circuit 130, provide relatively simple control of the electrical appliances 140, which may still reduce overlapping activation times. For example, the local processor circuit 130 may enable the different electrical appliances on a round robin basis in different time intervals until the local system 115 is able to re-establish communication with the remote system 105.

It will be also understood that the term "electrical appliance" as used herein refers to any electrical appliance that can demand a substantial amount of electrical power for operation. For example, an electrical appliance can include an electric heat pump, an electric air conditioner, an electric water heater, an electric pump and/or an electrical appliance that includes a pump, such as a pump used to operate a pool or spa. These types of electrical appliances are also sometimes referred to herein as "switched" electrical appliances.

The electrical appliance can also include a transient electrical appliance that demands a substantial amount of electrical power for operation, such as an electric range, an electric oven, an electric clothes dryer and/or an electric fan or blower, any of which are sometimes referred to herein as un-switched electrical appliances. It will be further understood that any combination of these electrical appliances can be included at the single customer location and controlled by the local system 115.

Figure 2A:
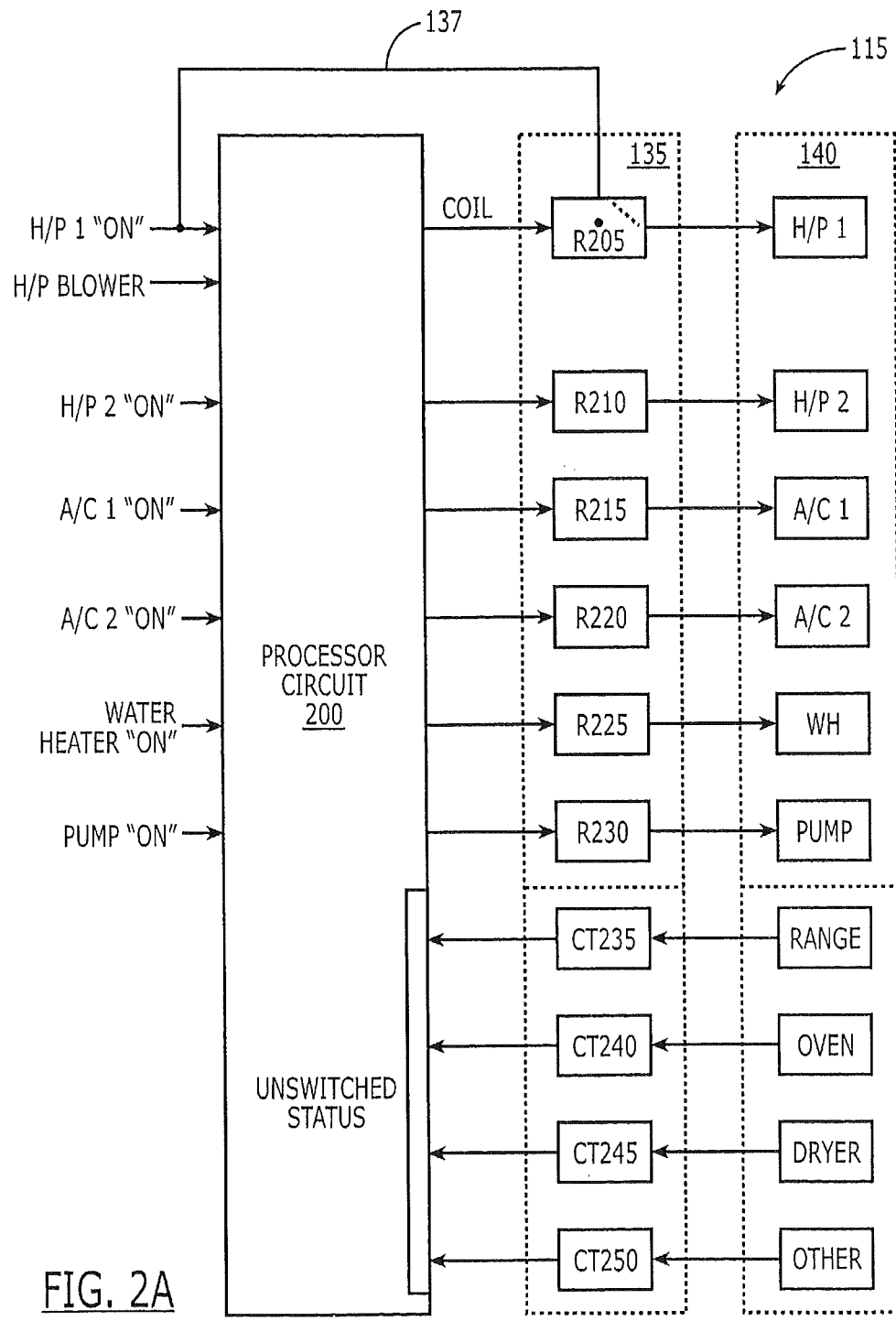
FIG. 2A is a block diagram that illustrates a local system processor circuit providing enable signals to an input/output circuit used to enable/disable electrical appliances in some embodiments according to the invention.

FIG. 2A is a block diagram that illustrates a local processor circuit 200 coupled to the input/output circuit 135 and electrical appliances 140 shown in FIG. 1, in some embodiments according to the invention. According to FIG. 2A, the processor circuit 200 receives requests from the switched electrical appliances (such as heat pumps, air conditions, water heaters, etc.) which indicate that the respective electrical appliance should be switched on responsive to some environmental parameter. For example, the environmental parameter can be an indication from a thermostat associated with a heat pump signaling that the measured temperature in the associated living space has reached a lower limit and, therefore, the heat pump should be activated to begin heating the living space. In some embodiments according to the invention, the processor circuit 200 can be an MC9S12NE64 microprocessor marketed by FreeScale® of Austin, Tex., which includes onboard memory (such as RAM, ROM, flash, etc.), I/O circuits, analog to digital converters, as well as a physical and/or wireless connection to an Ethernet network.

According to FIG. 2A, each of the switched electrical appliances can have an associated request provided to the processor circuit 200, where each indicates a request for activation from, for example, a thermostat associated with the respective electrical appliance. It will be understood that these switched request inputs from the electrical appliances can be provided to the processor circuit 200 directly or indirectly, including wired or wireless transmission, to an analog to digital converter circuit (not shown). Alternatively, the analog to digital converter circuit can be included in the processor circuit 200 itself, such as at an input stage of the processor circuit 200.

The processor circuit 200 is also coupled to relays (R205, R210, R215, R220, R225, and R230) via respective enablement signals corresponding to each of the requests received from the electrical appliances. For example, the processor circuit 200 provides an enablement signal to relay R205 that is used to enable/disable the activation of heat pump 1. The enablement signal provided to the relay 8205 can cause the contacts of the relay R205 to be configured to couple a request (H/P 1 "ON" 137) from thermostat to the heat pump. Similarly, each of the remaining relays is also provided with a respective enablement signal from the processor circuit 200 that is intended to control the respective electrical appliance which provided the associated request. Accordingly, each of the electrical appliances having a thermostat associated therewith can be activated/deactivated responsive to a corresponding relay providing the activation/deactivation signal from the associated thermostat. Accordingly, although not shown explicitly in FIG. 2A, each of the relays coupled to the switched electrical appliances can provide an associated request from the corresponding thermostat controlling the switched electrical appliance.

In some alternative embodiments according to the invention, the relays R205-230 are provided with electrical power 145, which can be coupled/decoupled to the respective electrical appliance responsive to the corresponding enablement signal from the processor circuit 200. For example, electrical power 145 can be coupled to the heat pump 1 responsive to an enablement signal to the relay R205 responsive to a request from a thermostat associated with heat pump 1 provided to the processor circuit 200. It will be understood that the enablement signals provided by the processor circuit 200 can undergo a digital to analog conversion before being provided to the respective relays R205-230 so that the processor circuit 200 can provide adequate control.

Figure 2B:
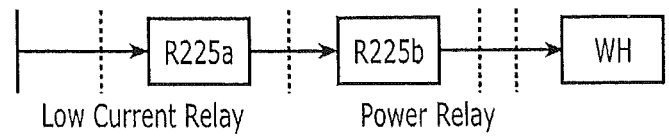
FIG. 2B any is a block diagram that illustrates the relay circuits shown in FIG. 2A including a low current relay and a power relay in some embodiments according to the invention.

Moreover, relays which control relatively high power electrical appliances (such as a water heaters), can include a low current relay configured to drive a high power relay as shown, for example, in FIG. 2B. As shown in FIG. 2B, the relay 225 configured to couple/decouple power to the water heater can include a low current relay 225*a* that is connected in series with a higher power relay 225*b*, which in-turn is configured to couple/decouple power to/from the water heater.

It will further be understood that the relays R205-230 can be configured to remain in a closed position in the absence of any input from the processor circuit 200. For example, if the processor circuit 200 goes off-line, fails, or is otherwise unable to communicate with the remote system 105 so that no determinations can be provided regarding which electrical appliances are to be enabled/disabled, the relays 205-230 can remain in a state that statically couples the power 145 to each of the electrical appliances. Accordingly, continuous electrical service may be provided to the single customer location uninterrupted despite the suspension of the determination to reduce overlapping activation times of the different electrical appliances.

It will further be understood that the relays 205-230 can refer to two or more relays coupled together to facilitate the control of the processor circuit 200 over the switched electrical appliances, as shown in FIG. 2B. For example, the relays can actually refer to a power relay that is suitable for coupling/decoupling of substantial amounts of current to/from the electrical appliance connected to a relatively lower power relay that is more suited for operation by the processor circuit 200.

It will further be understood that although each of the switched inputs provided to the processor circuit 200 are illustrated as being the same, each of the inputs may call for separate signal conditioning based on, for example, the voltage levels over which the respective signal operates. For example, the request from the water heater may operate over relatively high voltage levels due to the nature of the switches integrated into the hot water heater for the operation thereof. Accordingly, the request from the hot water heater may undergo conditioning so that the voltage levels provided to the processor circuit 200 are adequate. Furthermore, the switched requests from the electrical appliances may be optically coupled to the processor circuit 200 to provide adequate isolation between the electrical appliance and the processor circuit 200.

The processor circuit 200 also receives inputs from transient un-switched electrical appliances, such as an electric range, an electric oven, an electric dryer, and/or an electric blower or fan. The inputs from these un-switched electrical appliances can take the form of signals indicating that the respective electrical appliance is in operation. For example, the processor circuit 200 can receive a signal indicating that an electric range has been switched on, which is provided via a current transformer 235. Similarly, each of the other un-switched electrical appliances can be associated with a respective current transformer 240, 245, and 250, each of which provide an indication to the processor circuit 200 that the respective un-switched electrical appliance is in operation.

The processor circuit 200 can use these indications of un-switched electrical appliance activation as the basis of messages to the remote system 105. In accordance, the remote system 105 may respond to the message from the processor circuit 200 that an un-switched electrical appliances is currently in operation by transmitting a response message to the processor circuit 200 indicating that one or more of the switched electrical appliances should be disabled.

It will further be understood that the inputs provided from the current transformers 235-250 can undergo signal conditioning (such as analog to digital conversion) as described above in reference to the requests from the switched electrical appliances. In some embodiments according to the invention, the analog to digital conversion for the inputs provided by the current transformers may be different than the analog to digital conversion provided for the inputs from the switched electrical appliances.

FIG. 3 is a block diagram that illustrates processing of messages by the demand management server/remote system 105 and the processor circuit 200 located at the single customer location in response to requests from electrical appliances in some embodiments according to the invention. According to FIG. 3, the processor circuit 200 receives a request from a thermostat associated with a heat pump 1 indicating that an environmental parameter (e.g., temperature) has reached a lower operating level so that the living space should be heated by heat pump 1.

In some embodiments according to the invention, the processor circuit 200 formulates a message request 300 to the remote system 105 including a payload that indicates which electrical appliance (i.e., heat pump 1) has requested activation. It will be understood that the payload of the request message 300 can include additional information beyond the identity of the electrical appliance requesting activation.

If the remote system 105 determines that heat pump 1 should be activated, the response system 105 transmits a response message 305 to the processor circuit 200. Upon receipt of the response message 305, the processor circuit 200 asserts an enablement signal 310 to the relay R205 that couples the request from the thermostat to heat pump 1. It will be further understood that the remote system 105 can subsequently determine that heat pump 1 should be deactivated whereupon a response message 305 is sent to the processor circuit 200 indicating that the enablement signal 310 should be deactivated. In response, the relay R205 is reset so that the request from the thermostat is decoupled from the heat pump 1. In still other embodiments according to the invention, the response message 305 that caused the heat pump 1 to be activated can also include an indication of when the heat pump should be disabled by the processor circuit 200, to thereby reduce the need for additional messages.

The demand management server can control the different electrical appliances based on the nature of the specific electrical appliance requesting activation as well as general rules regarding off-peak and on-peak time intervals. For example, the demand management sever can operate so that during off peak time intervals, little or no effort can be made to reduce overlapping activation times as the demand during off-peak hours may not be critical to electrical service providers and, moreover, is not used to determine maximum power usage for time of use billing.

During on-peak time intervals, the demand management server may operate each of the electrical appliances differently during each of the time intervals. For example, during on-peak time intervals, the demand management server may operate water heaters with a default setting that such heaters are only enabled for activation when no other electrical appliances are active. In some embodiments according to the invention, the demand management server can operate so that electric water heaters are enabled for activation for only a portion of every time interval, and further, can be enabled for activation based on what other electrical appliances are currently enabled. For example, the electric hot water heater may be assigned a relatively low priority so that other electrical appliances will be enabled for activation before the electric hot water heater.

The demand management server/remote system 105 can operate heat pumps and air conditioners according to a prioritization scheme during on-peak intervals so that certain living spaces known to be used more during the peak time intervals have priority over other living areas. For example, the living area of a house including the bedrooms may have lower priority during peak hours during colder months of the year as these rooms are typically not used significantly during the peak time intervals. In some embodiments according to the invention, the demand management server can control the maximum amount of time that heat pumps and air conditioners are allowed to run during any time interval. For example, the demand management server may limit the maximum run time to one-half of a time interval. Furthermore, in some embodiments according to the invention, the demand management server can operate the heat pumps and/or air conditioners so that a minimum time between enablement or activations is observed. For example, the demand management server may operate heat pumps/air conditioners so that the high priority living space is provided with service more frequently than less important living spaces. In still other embodiments according to the invention, the demand management server may toggle the priority of the living spaces or assign the priority in a round-robin type scheduling.

Referring to FIGS. 2 and 3, the demand management server can monitor operations of the electrical appliances to collect performance data. The performance data may be used to provide service notices to, for example, the customer. For example, the demand management server can monitor a heat pump's air handling blower fan's operation (on/off time etc.) to notify the customer that air filters may need to be changed. In particular, the blower fan can be monitored by tapping the corresponding thermostat wire that provides an indication to the processor circuit 200 regarding the operation of the blower. Accordingly, the processor circuit 200 can monitor the periodic operation of the blower and formulate request messages 300 to the remote system 105 which indicates the usage of the blower. Such information may be used by the remote system to signal when periodic maintenance should be provided to the system in which the blower is included.

In still further embodiments according to the invention, the demand management server can monitor requests from particular electrical appliances to determine whether the respective electrical appliance is operating as expected. For example, the remote system 105 may determine that heat pump 1 is experiencing potential problems due to either the number of request messages 300 requesting activation of heat pump 1 or the duration that the heat pump is running during uncontrolled off peak hours is different then expected . The remote system 105 may determine that (based, for example, on the number of times that heat pump 1 has been cycled to date) that heat pump 1 may require service. The remote system 105 may also determine that heat pump 1 may require service based on the time needed to heat the associated living space with reference to an outside temperature. Alternatively, the remote system 105 may determine that the heat pump 1 is likely experiencing some undiagnosed problem such as a leak which may affect the efficiency of heat pump 1.

In still further embodiments according to the invention, the demand management server may monitor the time elapsed between a request for activation and the time at which the request from heat pump 1 is removed. In particular, the demand management server may determine historic data regarding the performance of heat pump 1. For example, the demand management server may collect historic data that indicates that heat pump 1 has, on average, taken an approximate amount of time to heat the associated living space to a desired temperature. Over time, the demand management server may further determine that the time between the initiation of a request from heat pump 1 and the removal of the request from heat pump 1 has increased (indicating that the upper temperature limit associated with the thermostat has been reached) thereby indicating that heat pump 1 may be experiencing a loss in efficiency due to the increased time needed to heat the living space to the desired upper temperature limit. Although the operations described above reference the operation of a heat pump and a blower, it will be understood that similar types of monitoring may be provided for other electrical appliances such as air conditioners, hot water heaters, pumps, etc.

In some embodiments according to the invention, messages between the local and remote systems can be structured according to any format that allows the transmission thereof over the network(s) described herein. For example, the message format can be that of an ICMP message, which is are described in the RFC 792 specification located on the Internet at faqs.org/rfcs/rfc792.html. The disclosure of RFC 792 is hereby incorporated herein by reference in its entirety. Other message structures, such as UDP, TCP/IP, IGMP, ARP, and RARP, can also be used.

The messages may also be transmitted wirelessly using, for example, Short Message Service (SMS) or Enhanced Message Service (EMS) formatted messages, Multimedia Message Service (MMS), and/or Smartmessaging™ formatted messages. As is known to those skilled in the art, SMS and EMS messages can be transmitted on digital networks, such as GSM networks, allowing relatively small text messages (for example, 160 characters in size) to be sent and received via the network operator's message center to the mobile device 20, or from the Internet, using a so-called SMS (or EMS) "gateway" website. Accordingly, if either the local or remote system is off-line, the SMS messages (or commands) can be stored by the network, and delivered later when the respective system is on-line again.

MMS is a messaging system for asynchronous messaging, which is based on the SMS standard, but which enables communication of messages containing "rich media" content, i.e., content of types that tend to be more data-intensive than text. MMS is standardized by the WAP Forum and the Third-Generation Partnership Project (3GPP) and is described in: "WAP MMS, Architecture Overview," WAP-205, WAP Forum (Approved Version Apr. 25, 2001); "WAP MMS, Client Transactions Specification," WAP-206, WAP Forum (Approved Version Jan. 15, 2002); "WAP MMS, Encapsulation Specification," WAP-209, WAP Forum (Approved Version Jan. 5, 2002); "Requirements", 3GPP specification 22.140; and "Architecture and Functionality," 3GPP specification 23.140.

Figures 4, 5:
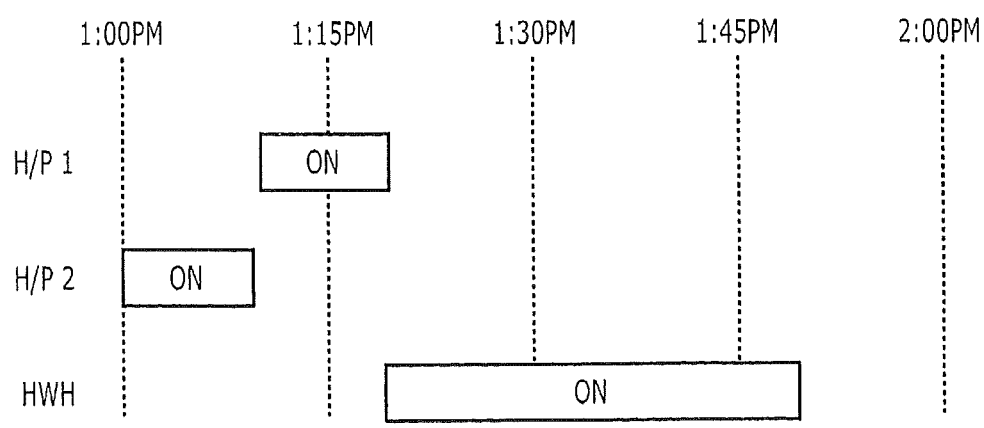
FIG. 4 is a table that illustrates state information related to the current status and previous status of selected electrical appliances in some embodiments according to the invention.
FIG. 5 is a timeline illustrating enablement/disablement of respective electrical appliances in some embodiments according to the invention.

FIG. 4 is a table that illustrates status information that may be maintained by the demand management server for use in determining whether enablement of a particular appliance should be provided by the processor circuit 200. In particular, the demand management server can record which of the electrical appliances is currently on and which of the electrical appliances was previously on during the current time interval. For example, the demand management server can monitor request messages from the processor circuit 200 to determine that heat pump 1 is currently on but has not previously been on during the current time interval. Furthermore, messages from the processor circuit 200 can indicate that heat pump 1 is not currently on but was previously on during the current time interval. Similar data can be recorded for the other electrical appliances.

FIG. 5 is a timeline that illustrates activation of electrical appliances located at the single customer location so as to reduce overlapping activation times thereof during time intervals of the day. According to FIG. 5, heat pump 2 (H/P 2) is enabled for activation at approximately 1:00 p.m. and disabled for activation at about 1:10 p.m. Subsequent to the disablement of heat pump 2, heat pump 1 (H/P 1) is enabled for activation until about 1:20, whereupon heat pump 1 is disabled. Subsequent to the disablement of heat pump 1, the hot water heater (WH) is enabled for activation through approximately 1:50 p.m. Therefore, as shown in FIG. 5, the electrical appliances HP1, HP2, and WH are enabled for activation during different time intervals so as to reduce the overlapping activation time thereof.

It will be understood that the time interval as defined in FIG. 5 includes any time interval for which one of the electrical appliances is enabled for activation. For example, the time interval for H/P2 is the time between 1:00 p.m. and 1:10 p.m., whereas the time interval for H/P1 is about 1:10 p.m. to about 1:20 p.m. Accordingly, none of the electrical appliances is activated during overlapping time intervals, which may allow a reduction in the demand associated with the single customer location serviced by the electrical service provider.

Figure 6:
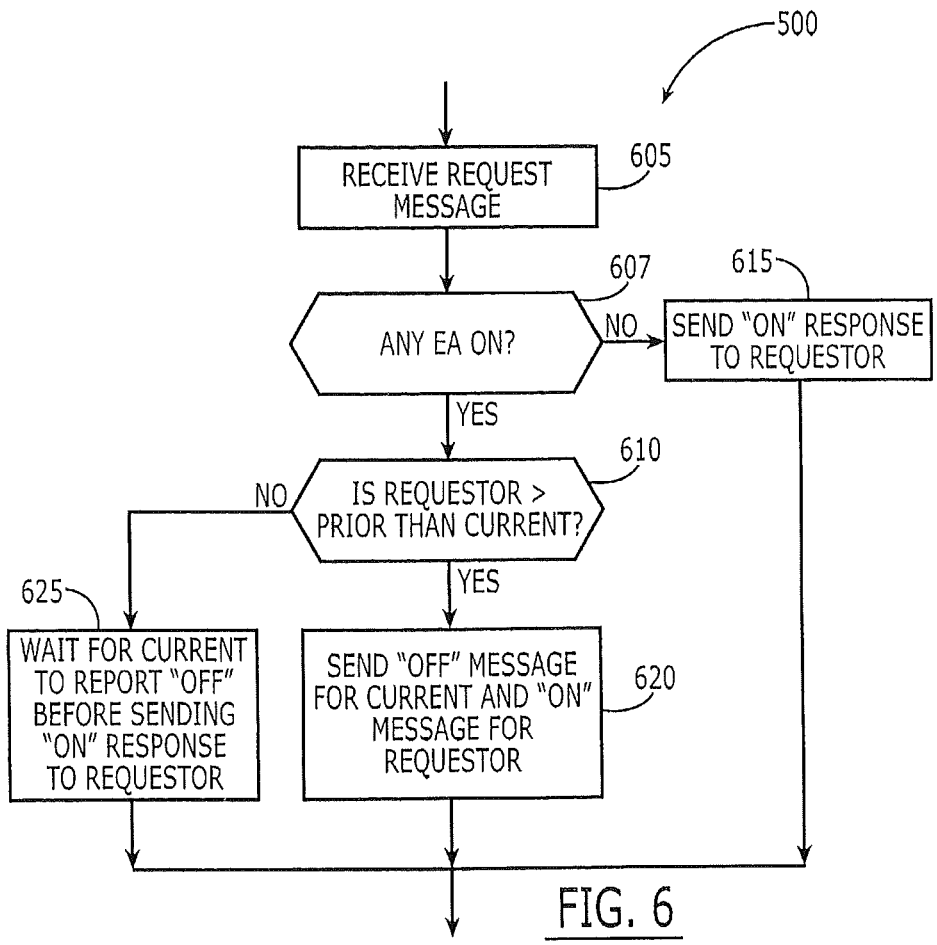
FIG. 6 is a flowchart that illustrates operations of local and remote systems according to the timeline illustrated in FIG. 5 in some embodiments according to the invention.

FIG. 6 is a flowchart that illustrates operations of local and remote systems according to the timeline illustrated in FIG. 5 in some embodiments according to the invention. Referring to FIGS. 3-6, a request from an electrical appliance (EA) is received at the processor circuit 200, whereupon the processor circuit 200 transmits a request message 300 to the demand management server (block 605). The demand management server accesses the table shown in FIG. 4 to determine if any of the appliances are currently enabled at the single customer location (block 607). If no electrical appliances are currently enabled for activation at the single customer location (block 607), the remote system 105 transmits a response message 305 indicating that the processor circuit 200 is to enable the requesting electrical appliance for activation by asserting the enablement signal 310 (block 615), and then returns to a state awaiting a new request from an electrical appliance.

If, however, at least one of the other electrical appliances at the single customer location is currently enabled for activation at the single customer location (block 607), the demand management server determines if the requesting electrical appliance has a greater priority than the electrical appliance that is currently enabled for activation (block 610). If the requesting electrical appliance has a lower priority than the currently enabled electrical appliance (block 610), the demand management server waits for the currently enabled electrical appliance to report an off status before sending a response message 305 indicating that the requesting electrical appliance is to be enabled by the processor circuit 200 (block 625), whereupon the demand management server returns to a state awaiting a new request.

If, however, the requesting electrical appliance does have a higher priority than the currently enabled electrical appliance (block 610), the remote system 105 transmits a response message 305 indicating that the currently enabled electrical appliance is to be disabled by the processor circuit 200. Furthermore, the remote system 105 transmits a response message 305 indicating that the processor circuit 200 is to enable the requesting electrical appliance having the higher priority (block 620), whereupon the demand management server returns to a state awaiting a new request.

It will be understood that although the demand management server is described above as sending separate response messages 305 indicating first an off for the currently enabled electrical appliance and a second message indicating enablement of the higher priority requesting electrical appliance, both commands may be included in a single response message in some embodiments according to the invention.

Figure 7:
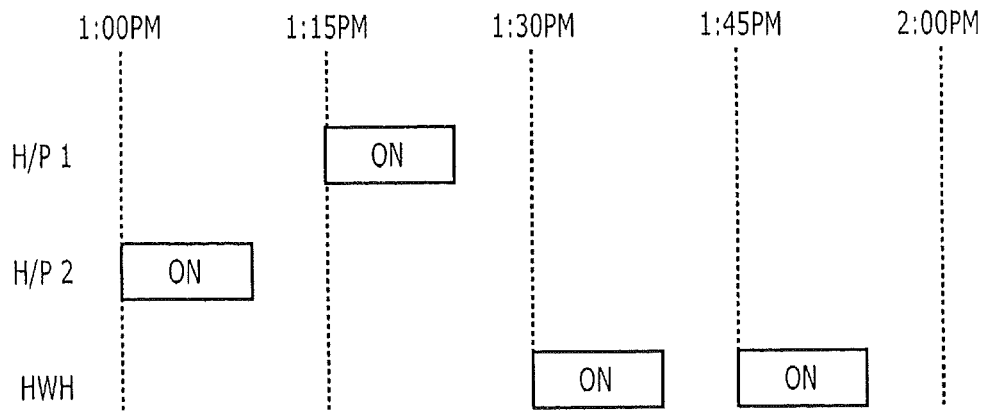
FIG. 7 is a timeline that illustrates enablement/disablement of respective electrical appliances during different time intervals in some embodiments according to the invention.

FIG. 7 is a timeline that illustrates enablement for activation of electrical appliances during different time intervals defined by the electrical service provider in some embodiments according to the invention. According to FIG. 7, electrical appliance H/P 2 is enabled for activation at a time interval beginning at 1:00 p.m. At some time during the first time interval beginning at 1:00 p.m., the electrical appliance H/P 2 is deactivated after reaching an upper operational limit (e.g. upper temperature setting of a thermostat).

As shown in FIG. 7, during the latter part of the first time interval after the deactivation of electrical appliance H/P 2, no other electrical appliances are enabled for activation during that time interval. At the start of the second time interval at about 1:15 p.m., electrical appliance H/P 1 is enabled for activation. Subsequently, during the same time interval beginning at 1:15 p.m., the electrical appliance H/P 1 is deactivated.

During a later portion of the second time interval, no other electrical appliance is activated for the remainder of that time interval. As further shown in FIG. 7, the electrical appliance WH is enabled for activation during the third time interval at around 1:30 p.m., and later deactivated during the same time interval. No electrical appliance is activated during the third time interval after the deactivation of the electrical appliance WH. During a fourth time interval beginning at around 1:45 p.m., the electrical appliance WH is again enabled for activation during the subsequent time interval, and is deactivated during the same fourth time interval prior to the end thereof. Accordingly, as shown in FIG. 7, the activation of the different electrical appliances can be controlled so that only one electrical appliance is on during a single time interval.

Although the time interval described in reference to FIG. 7 is defined as 15 minutes, the time interval can be defined by the electrical service provider to be any predetermined time. Moreover, the time interval is defined by the electrical service provider to coincide with the periods during which the electrical service provider measures the maximum amount of power used for the purposes of billing under the time-of-use billing system described herein. Accordingly, the operations shown in FIG. 7 can allow the reduction of overlapping activation times of the different electrical appliances by synchronizing the activation times to the predetermined time intervals defined by the electrical service provider.

Figure 8:
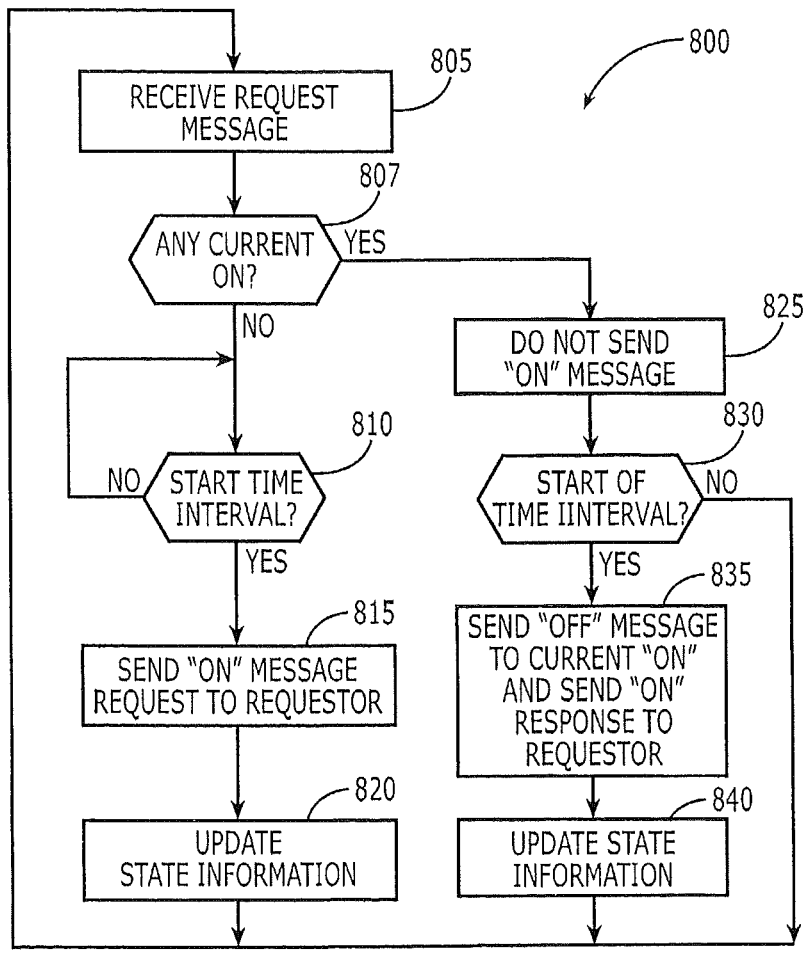
FIG. 8 is a flowchart that illustrates operations of local and remote systems according to the timeline illustrated in FIG. 7 in some embodiments according to the invention.

FIG. 8 is a flowchart that illustrates operations of the systems described herein in accordance with the timeline shown in FIG. 7 in some embodiments according to the invention. According to FIG. 8, a request for activation is received from an electrical appliance and the processor circuit 200 forwards a request message 300 to the remote system 105 (block 805). The demand management server determines if any electrical appliance is currently enabled for activation at the single customer location (block 807). If the demand management server determines that no other electrical appliance is currently enabled for activation (block 807), the demand management server further determines whether the start of a predetermined time interval defined by the electrical service provider has been reached (block 810). If the demand management server determines that the start of the time interval has not been reached (block 810), the demand management server withholds the transmission of response messages until the start of the next time interval.

If however, the demand management server determines that the next time interval has started (block 810), the demand management server sends a response message 305 indicating that the requesting electrical appliance is to be enabled for activation through the processor circuit 200 assertion of the enablement signal 310 (block 815). The demand management server further updates the state table shown in FIG. 4 indicating that the requesting electrical appliance has been enabled for activation at the single customer location (block 820), and returns to a state awaiting another request.

If, however, the demand management server determines that another electrical appliance is currently enabled for activation at the single customer location (block 807), the demand management server withholds a response message 305 indicating that the requesting electrical appliance is to be enabled (block 825). It will be understood that, in some embodiments according to the invention, a response message 305 may be sent, however, the response message 305 may simply be an indication that the request was received while not indicating that the requesting electrical appliance is to be enabled. If the demand management server determines that the start of the next time interval has begun (block 830), a response message 305 is transmitted to the processor circuit 200 indicating that the requesting electrical appliance is to be enabled for activation.

Furthermore, the demand management server transmits a message indicating that the currently on electrical appliance is to be disabled (block 835). The demand management server further updates the state table shown in FIG. 4 to indicate that the currently on electrical appliance has now been disabled and that the requesting electrical appliance has been enabled for activation (block 840). The demand management server then returns to a state awaiting another request for activation.

Figure 9:
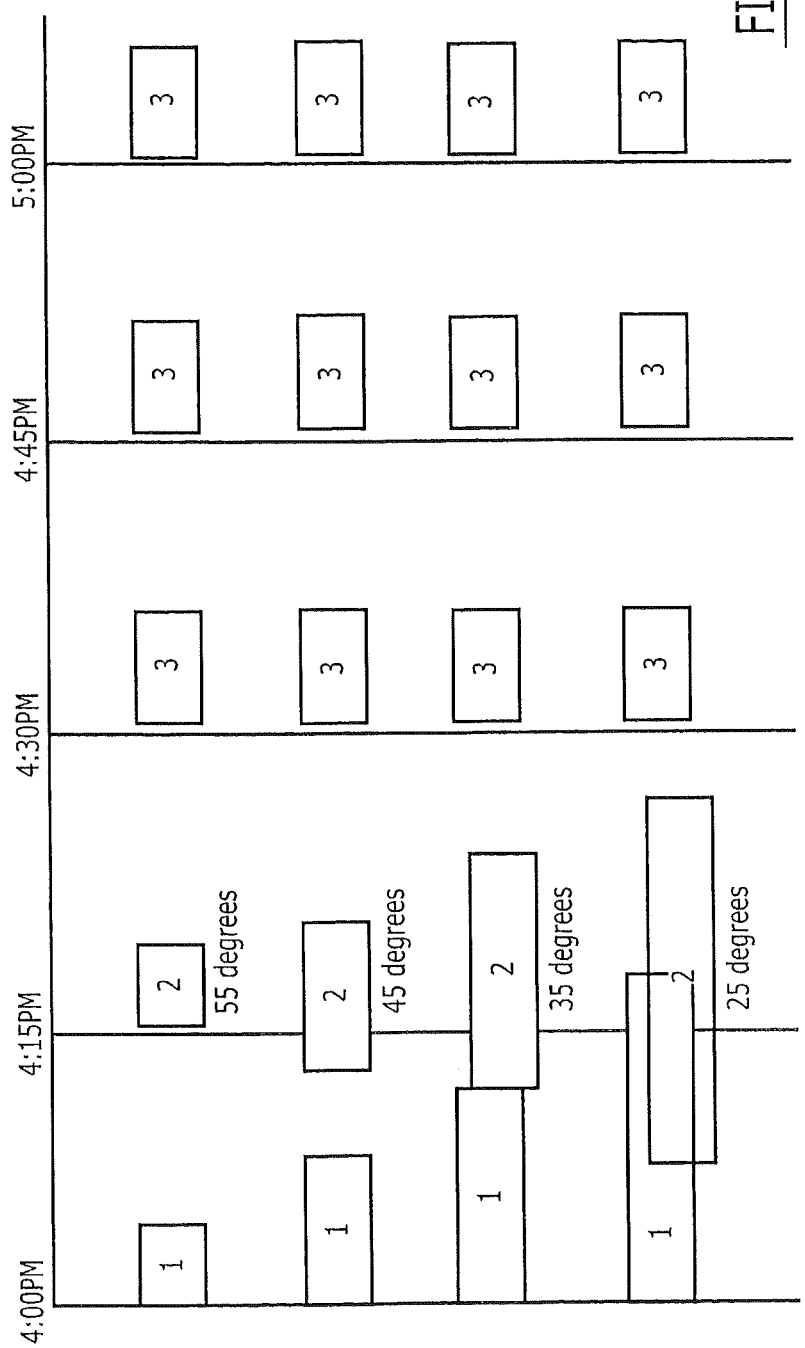
FIG. 9 is a timeline that illustrates enablement/disablement of respective electrical appliances as a function of environmental factors in some embodiments according to the invention.

FIG. 9 is a timeline that illustrates variation in the enablement for activation of electrical appliances in different time intervals and within the same time interval including overlapping times in response to variations in outside temperature in some embodiments according to the invention. According to FIG. 9, when the temperature outside is relatively mild (i.e. 55 degrees), an electrical appliance (such as heat pumps and hot water heaters) can operate as described above in reference to FIGS. 7 and 8 where different electrical appliances are enabled for activation during different time intervals to reduce overlapping activation times.

However, as further shown in FIG. 9, as the outside temperature begins to drop, it may be more difficult to maintain a suitable comfort level inside the single customer location so that some of the electrical appliances may be enabled for activation during a later portion of the same time interval in which another electrical appliance was enabled. For example, as shown in FIG. 9, when the outside temperature decreases to 45 degrees, the second heat pump (2) may be enabled for activation during the first time interval when the first heat pump is also enabled. Although the first and second heat pumps can be enabled during the same time interval, the demand management server may enable the different heat pumps so as to reduce the overlapping activation times by advancing the activation time of the second heat pump from the beginning of the second time interval. In other words, the demand management server can advance the time at which the second heat pump would otherwise be enabled into the first time interval, but also avoid concurrent activation of the second heat pump with the first heat pump.

As further shown in FIG. 9, when the outside temperature is further reduced to 35 degrees, the second heat pump may be activated within the first time interval immediately adjacent to the time at which the first heat pump is disabled. Again, the activation of the second heat pump can be advanced from the start of the second time interval (where the second heat pump would otherwise be enabled) to maintain the comfort level at the single customer location.

When the outside temperature drops to 25 degrees, the first and second heat pumps may operate concurrently during the first time interval, but may still have reduced overlapping activation times as the first heat pump may operate from the start of the first time interval, whereas the second heat pump may activate during the later portion of the first time interval so as to still reduce the overlapping activation time despite the need to increased heating due to the lower outside temperature.

FIG. 9 also shows the periodic enablement for activation of the hot water heater during the third and fourth time intervals between 4:30 pm and 5:00 pm as well as the first interval after 5 pm. Accordingly, the time shifting of the enablement for activation of the hot water heater allows for a reduction in the overlapping activation time with either the first or second heat pumps. In other words, the demand management server may still reduce overlapping activation time of the hot water heater by recognizing the increased need for the heat pumps to possibly run concurrently and, therefore, time-shift the operation of the hot water heater to other time intervals.

Figure 10:
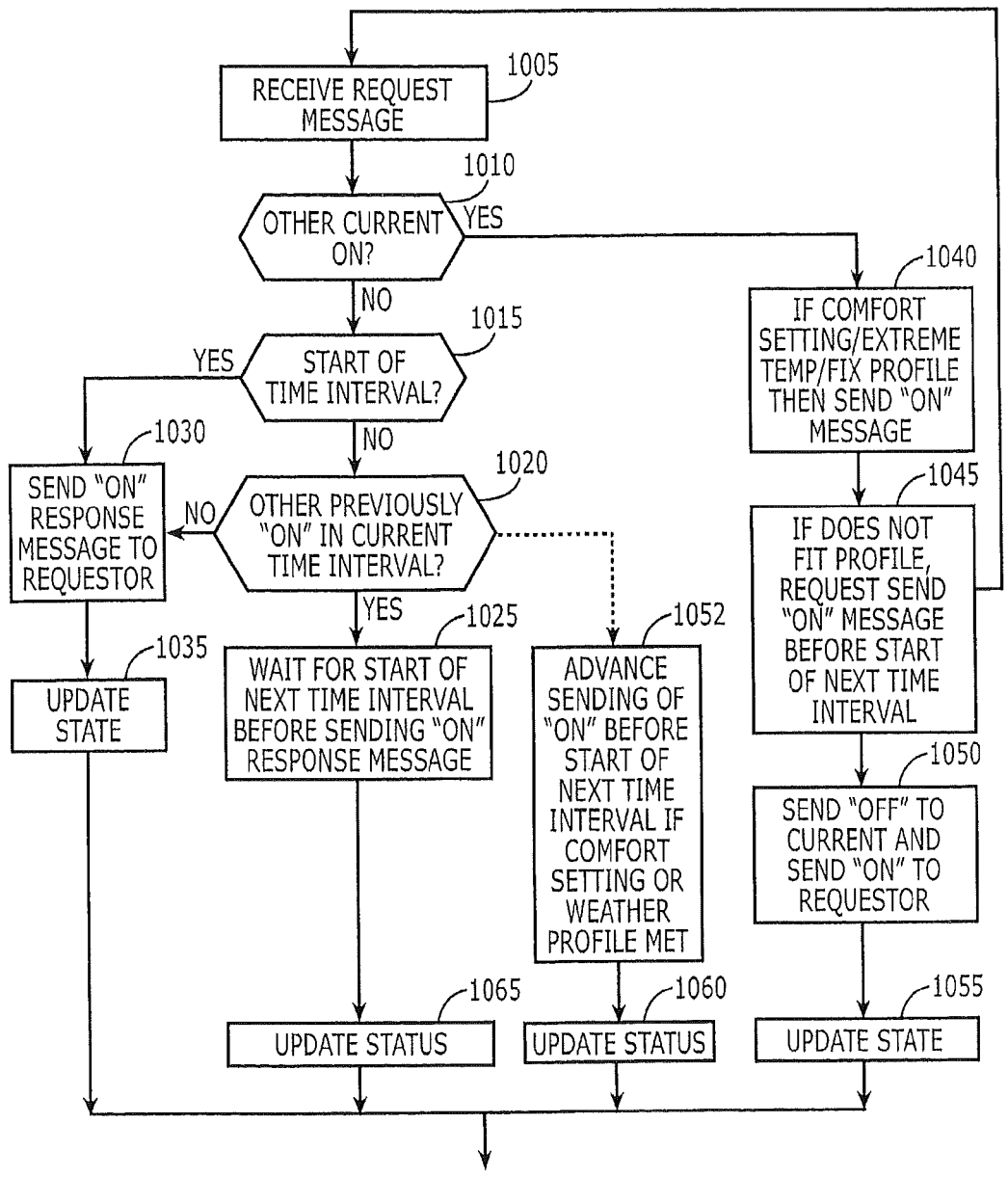
FIG. 10 is a flowchart that illustrates operations of local and remote systems according to the timeline illustrated in FIG. 9 in some embodiments according to the invention.

FIG. 10 is a flow chart that illustrates operations of the systems described herein in accordance with the timeline shown in FIG. 9 in some embodiments according to the invention. According to FIG. 10, an electrical appliance provides a request to the processor circuit 200 for activation, which forwards a request message 300 to the remote system 105 (Block 1005). The demand management server determines if any other electrical appliances are currently enabled for activation (Block 1010). If no other electrical appliances are enabled for activation (Block 1010) the demand management server determines whether the start of a time interval has begun (Block 1015). If the demand management server determines that a time interval has begun (Block 1015), the remote system 105 sends a response message 305 indicating that the requesting electrical appliance should be enabled by the processor circuit 200 (Block 1030). The remote system 105 then updates the status table shown in FIG. 4 to reflect that the requesting electrical appliance has been activated during the current time interval (Block 1035), and returns to a state awaiting the receipt of another request for activation.

If, however, the demand management server determines that a new time interval has not begun (Block 1015), the demand management server determines whether other electrical appliances were previously enabled for activation in the current time interval (Block 1020). If other electrical appliances were not enabled for activation during the current time interval, the remote system 105 sends a response message 305 to the processor circuit 200 indicating that the requesting electrical appliance should be enabled for activation (Block 1030), and then proceeds according to Blocks 1030 and 1035.

If, however, the demand management server determines that other electrical appliances were previously enabled during the current time interval (Block 1020), the demand management server waits for the start of the next time interval before sending a response message 305 indicating to the processor circuit 200 that the electrical appliance requesting activation be enabled (Block 1025). The demand management server then updates the status table shown in FIG. 4 to reflect that the requesting electrical appliance is now enabled for activation during the current time interval, and returns to a state awaiting the next request for activation (Block 1065).

Alternatively, upon determining that other electrical appliances have previously been enabled for activation in the current time interval (Block 1020), the remote system 105 can send a response message 305 to the processor circuit 200 indicating that the enablement for activation of the requesting appliance should be advanced into the current time interval, and should not be withheld until the start of the next time interval when, for example, the comfort settings or current weather associated with the single customer residence meet the profile associated with increased activation indicating that additional activations may be required, such as when the outside temperature is particularly low (Block 1052). The remote system 105 then updates the information included in the status table shown in FIG. 4 (Block 1060), and returns to a state of waiting for the next request for activation.

If, however, the demand management server determines that other electrical appliances are currently enabled for activation in the current time interval (Block 1010) the demand management server sends a response message 305 activating a second electrical appliance if the comfort settings, or temperature, etc. fit the profile associated with increased activation (Block 1040), such as when the external temperature is such that additional heating may be required. If, however, the demand management server determines that the current conditions do not warrant additional activation, the demand management server does not send a response message 305 activating the requesting electrical appliance until the start of the next time interval (Block 1045).

The demand management server can also send a response message 305 indicating that the processor circuit 200 should disable the currently activated electrical appliance and indicating that the requesting electrical appliance should be enabled for activation (Block 1050). The demand management server then updates the information in the status table shown in FIG. 4, and returns to a state of waiting a next request for activation.

Figure 11:
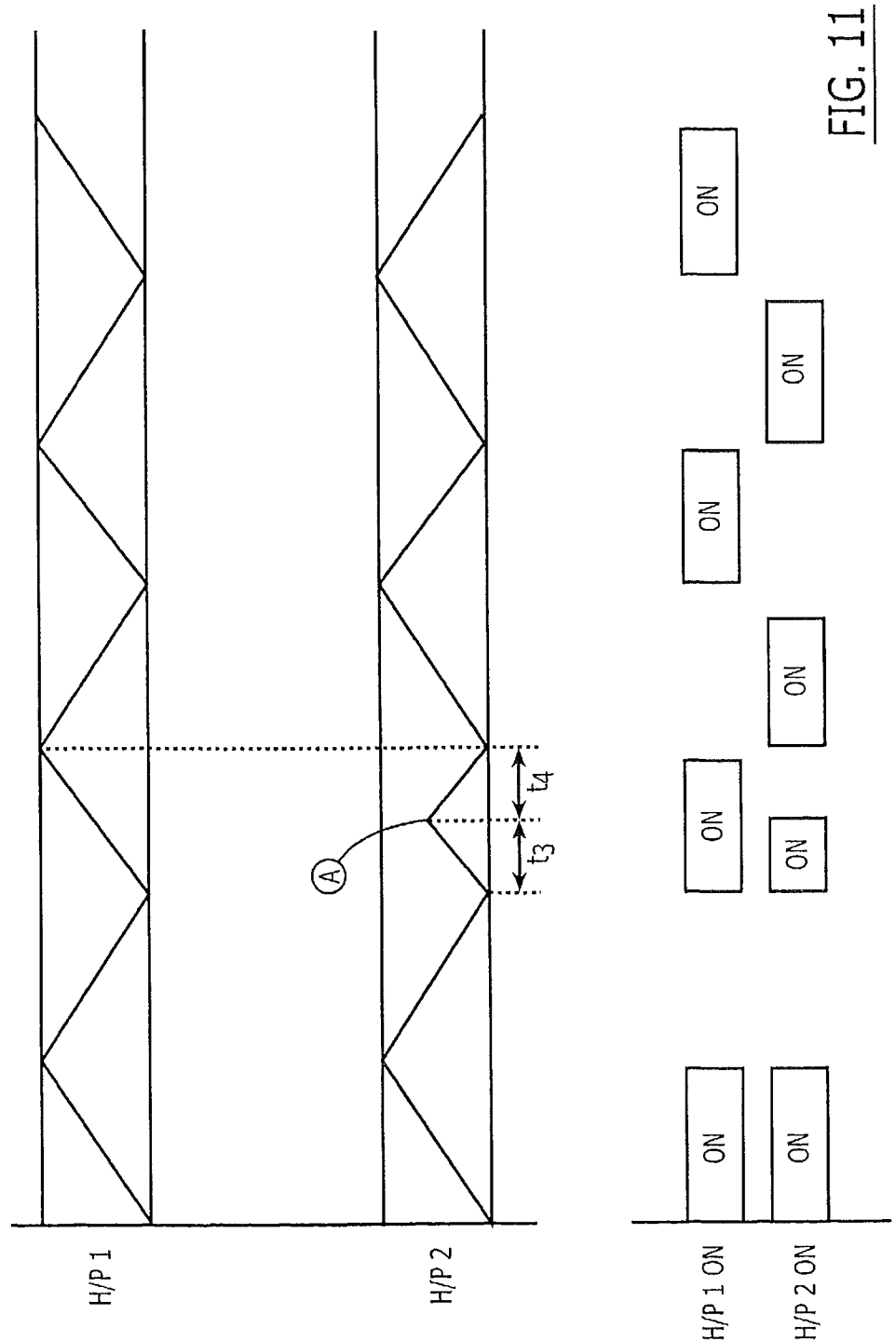
FIG. 11 is a timeline showing enablement/disablement of respective electrical appliances time-shifted into different time intervals in some embodiments according to the invention.

FIG. 11 is a timeline illustrating time shifting the activation of different electrical appliances into different time intervals during the day to reduce overlapping activation times in some embodiments according to the invention. In particular, FIG. 11 shows active and inactive time intervals for two respective heat pumps H/P1 and H/P2. During an initial phase (i.e., off-peak), H/P1 and H/P2 can both operate concurrently so that both heat pumps heat the respective living spaces simultaneously. During this off-peak interval, heating and cooling rates can be determined for the heat pump, which is to be time shifted relative to the other. For example, in FIG. 11 heat pump 2 is time-shifted relative to the operation of heat pump 1.

Both heat pump 1 and heat pump 2 operate by starting from an initial level in heating the respective living space to respective operational limits. Once the operational limit of heat pump is reached, the respective heat pump is inactivated through the operation of the thermostat. Accordingly, the off-peak interval can be used to determine respective heating and cooling rates for each of the heat pumps operating to heat the respective living space.

As further shown in FIG. 11, heat pump 2 can be time shifted to operate out of phase with respect to heat pump 1 by determining a deactivation time t3 for heat pump 2 to provide an initial time shift interval, after which heat pump 2 will be allowed to be activated while heat pump 1 is concurrently deactivated. In particular, the deactivation time t3 can be determined by estimating the amount of time needed for the respective living space heated by heat pump 2 to cool to the initial level at about the time that heat pump 1 is projected to reach the operational limit and become inactive. For example, if the projected time at which heat pump 1 is projected to become inactive is t3, the initial time shift interval can be provided by deactivating heat pump 2 in advance of the projected deactivation time for heat pump 1 based on the estimated rate of cooling of the living space associated with heat pump 2 upon reaching a temperature A.

Once the temperature of the living space heated by HP2 reaches temperature A, the heat pump 2 can be deactivated so that the living space starts to cool at a rate that is estimated during the off-peak interval. During the same time, heat pump 1 continues to heat the respective living space until reaching the projected time at which heat pump 2 will become inactive. At about the same time, the living space associated with heat pump 2 should have returned to the initial level after cooling in response to the deactivation of heat pump 2 during the initial time shift interval at time t3. Once heat pump 2 is reactivated and heat pump 1 is deactivated at time t4, both heat pump 1 and heat pump 2 can operate out of phase with each other.

Moreover, the operation of heat pump 1 and heat pump 2 can occur without the imposition of control signals by the processor circuit 200. In other words, once the operation of the heat pump 1 and heat pump 2 are time shifted with respect to one another, the operation of the respective heat pumps may be allowed to continue uninterrupted while still remaining out of phase with one another. This out of phase operation can allow a reduction in overlapping activation time of heat pumps at the single customer location to provide a reduction and a maximum amount of power monitored by the electrical service provided in a time of use billing arrangement thereby leading to both a reduction in the peak power that need be generated by the electrical service provider as well as a reduction in the demand at the single customer location.

Figure 12:
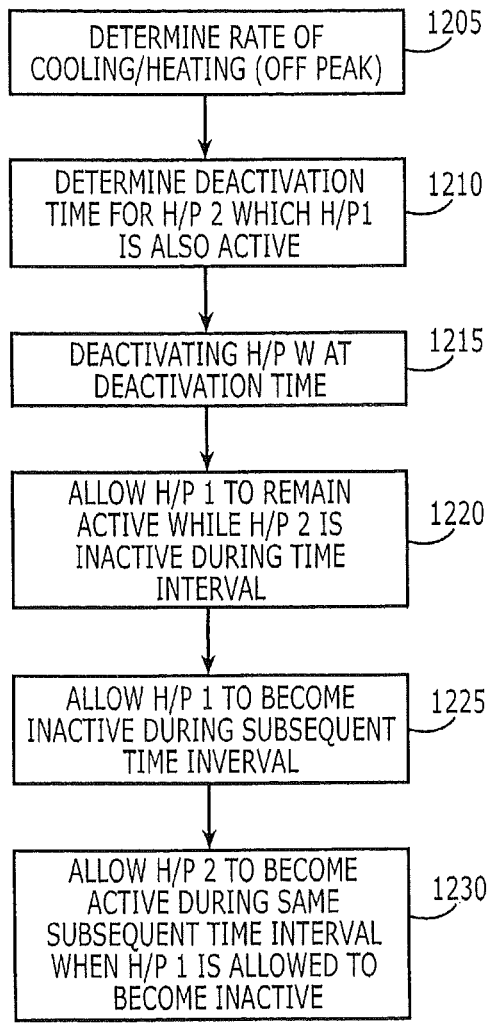
FIG. 12 is a flowchart that illustrates operations of local and remote systems according to the timeline illustrated in FIG. 11 in some embodiments according to the invention.

FIG. 12 is a flow chart that illustrates operations of heat pump 1 and heat pump 2 according to the timeline shown in FIG. 11 in some embodiments according to the invention. According to FIG. 12, a determination is made during off-peak operation of the rate of cooling and/or heating associated with the respective heat pump HP1/HP2 (Block 1205). A determination is then made of deactivation time for H/P2 when H/P1 is also active to provide an initial time shift interval (Block 1210), Heat pump 2 is disabled at the determined deactivation time while heat pump 1 continues activation (Block 1215). Heat pump 1 is allowed to remain active while HP2 remains inactive during the initial time shift interval (Block 1220). HP1 is allowed to become inactive during the subsequent time interval that projected time (Block 1225) and HP2 allowed to become active during the same time interval when HP1 is inactive (Block 1230).

Figure 13:
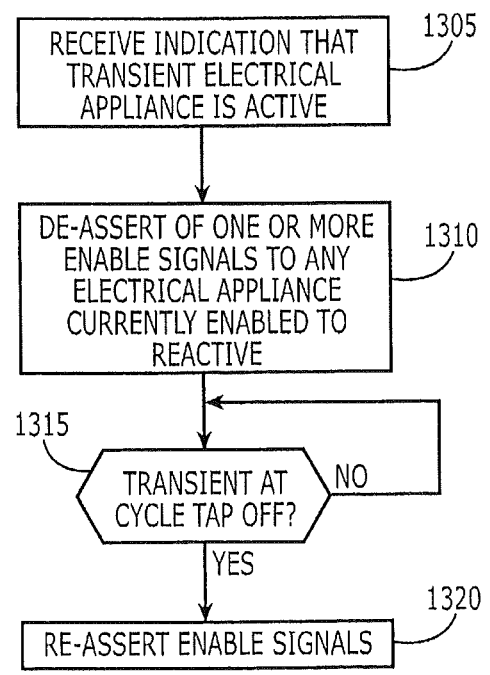
FIG. 13 is a flowchart that illustrates operations of local and remote systems responsive to indications that a transient electrical appliance has been activated in some embodiments according to the invention.

FIG. 13 is a flow chart that illustrates operations of local and remote systems in response to receipt of indications that transient electrical appliances are active in some embodiments according to the invention. It will be understood that these operations can be utilized in conjunction with any of the embodiments described herein to provide support for the handling of the operation of transient electrical appliances. According to FIG. 13, an indication is received at the processor circuit 200 that a transient electrical appliance (such as an electric range, an electric oven, electric clothes dryer, or the like) has become active (Block 1305). In response, the processor circuit 200 transmits a request message 300 to the demand management server indicating that the transient electrical appliance has been activated.

In response, the demand management server determines if any other electrical appliance is currently enabled for activation at the single customer location. If any other electrical appliances are currently enabled for activation, the demand management server transmits a response message 305 indicating that all switched electrical appliances that are currently active should be disabled by de-asserting the enablement signal 310 thereto (Block 1310). The processor circuit 200 continues to monitor the indication from the transient electrical appliances and can periodically transmit corresponding request messages 300 to the demand management server indicating the same.

Once the transient electrical appliances switches off, such as after reaching its preheat temperature or the temperature at which it will begin to cycle subsequently, (Block 1315) the processor circuit 200 transmits a request message 300 to the demand management server indicating that the transient electrical appliance has switched off. Accordingly, the remote system 105 then transmits a response message 305 indicating that the previously disabled electrical appliances can be re-enabled through assertion of the enablement signal 310 (Block 320).

Figure 14:
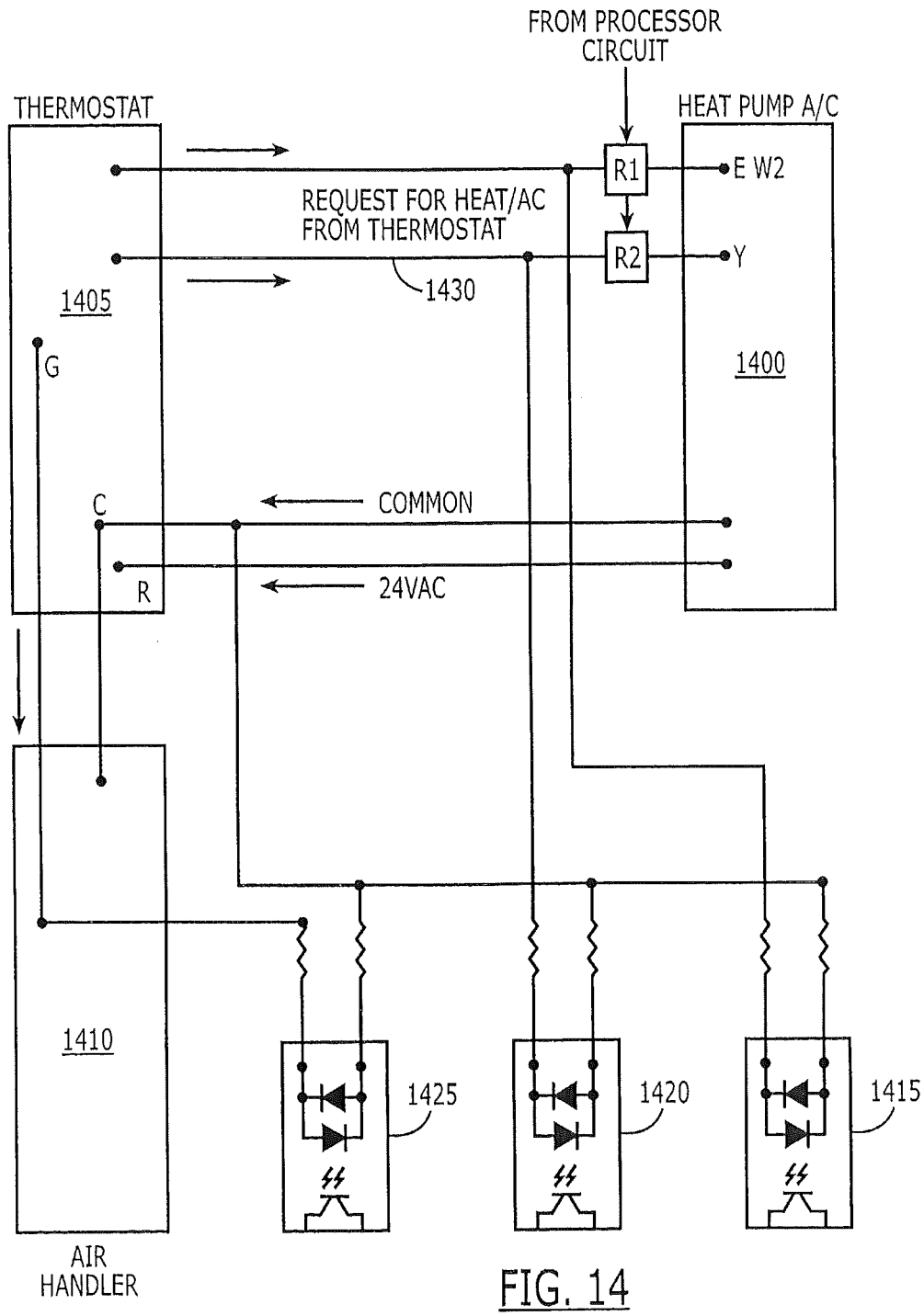
FIG. 14 is a schematic diagram that illustrates circuits and methods used for sensing activation/deactivation of, for example, heat pumps/air-conditioners in some embodiments according to the invention.

FIG. 14 is a schematic diagram that illustrates methods, circuits, and systems for sensing operations of electrical appliances in some embodiments according to the invention. According to FIG. 14, a thermostat 1405 is configured to operate an electrical appliance 1400 (such as a heat pump or air-conditioner) in conjunction with an air handler or blower 1410. Opto-couplers 1415, 1420, and 1425 are electrically coupled to the thermostat 1405, electrical appliance 1400, and the air handler 1410 for sensing the operations thereof and reporting to the processor circuit.

As further shown in FIG. 14, the electrical appliance 1400 provides 24 Volt AC signal and a common reference voltage to the thermostat 1405 at terminals R and C respectively. It will be understood that the thermostat 1405 can use the common reference voltage and 24 Volt AC signal for operational power. Furthermore, the thermostat 1405 can provide 24 V AC power to the air handler 1410 (via terminal G) for operation in conjunction with the electrical appliance 1400. For example, the thermostat 1405 can enable the electrical appliance 1400 along with the air handler 1410 so that heated or conditioned air provided by the electrical appliance 1400 can be circulated throughout the living space by the air handler 1410.

The thermostat 1405 can also provide requests to the relays R1 and the R2 which, in-turn, can provide for the activation/deactivation of the electrical appliance 1400 in response to respective enablement signals provided by the processor circuit as described above. For example, the thermostat 1405 can provide a Request for Heat/Air Conditioning 1430 to R2, which can be coupled to the electrical appliance 1400 in response to an enablement signal from the processor circuit (not shown).

In operation, the opto-couplers 1415, 1420, and 1425 are each configured to sense different operations provided by the structure shown in FIG. 14. In particular, when the Request for Heating/Air Conditioning 1430 is provided by the thermostat 1405, the voltage is provided the relay R2 and to one of the terminals of the opto-coupler 1420. Therefore, the terminals of the opto-coupler 1420 are biased by the Request for Heat/Air Conditioning 1430 and the common reference voltage provided by the electrical appliance 1400. In response, the opto-coupler 1420 can provide an indication to the processor circuit that the thermostat 1405 is requesting heating or cooling from the electrical appliance 1400.

The opto-couplers 1415 is configured to sense a voltage difference across the Request for Emergency Heat/Air Conditioning provided by the thermostat 1405 and the common reference voltage. Accordingly, when the thermostat 1405 provides the Request for Emergency Heating/Air Conditioning, the opto-coupler output indicates to the processor circuit that the thermostat 1405 is requesting Emergency Heating/Air Conditioning.

Still referring to FIG. 14, the opto-coupler 1425 can sense the activation of the air handler 1410 in response to the voltage provided thereto by the thermostat 1405. Accordingly, when the thermostat 1405 enables the air handler 1410, the terminals of the opto-coupler 1425 are biased across the 24 V AC signal (provided to the air handler 1410) and the common reference voltage (provided by the heat pump 1400). In response, the processor circuit can received the output of the opto-coupler 1425 to indicate operation of the air handler 1410.

Figure 15:
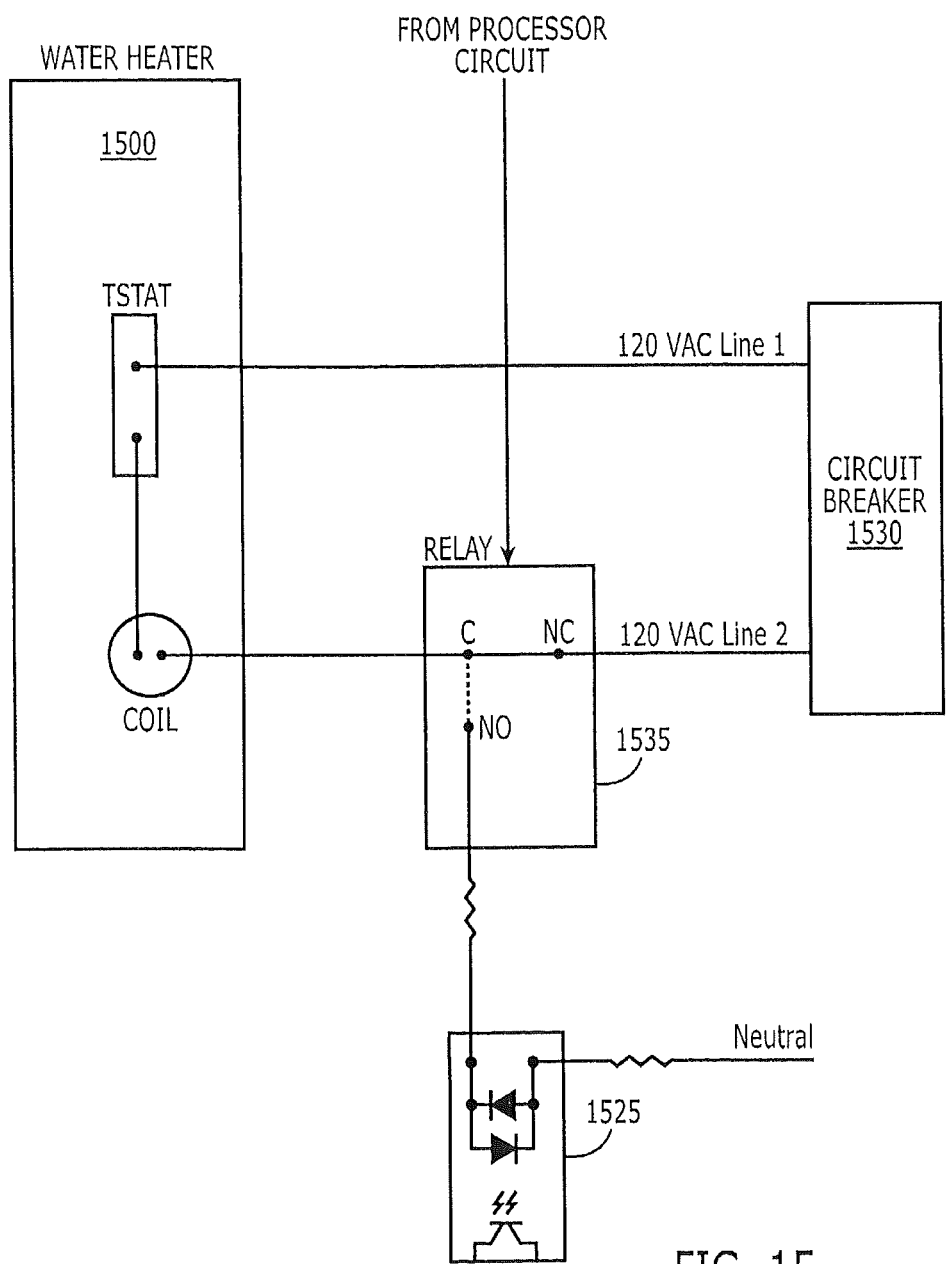
FIG. 15 is a schematic diagram that illustrates circuits and methods used for sensing activation/deactivation of, for example, water heaters in some embodiments according to the invention.

FIG. 15 is a schematic diagram that illustrates methods, circuits, and systems used to sense the operations of water heaters in some embodiments according to the invention. According to FIG. 15, a water heater 1500 can be coupled to a pair of 120 V AC lines via a relay 1535. Specifically, the water heater 1500 includes a heating element used to heat water stored in a tank, according to a water heater thermostat setting.

The relay 1535 is coupled to an enablement signal provided by the processor circuit as described above. In normal operation, the enablement signal is disabled so that the relay 1535 couples one of the 120 V AC lines from a circuit breaker 1530 to a terminal of the heating coil. Accordingly, when the relay 1535 is in this configuration, the water heater 1500 can heat water to a temperature setting indicated by the thermostat. However, when the enablement signal from the processor circuit is enabled, the relay 1535 decouples the terminal of the heating coil from the 120 V AC line provided via the relay 1535. Accordingly, in this configuration, the water heater 1500 is not able to heat water as the second 120 V AC line is decoupled from the heating coil.

When the relay 1535 decouples the 120 V AC line from the heating coil, the terminal of the heating coil is instead coupled to a first terminal of an opto-coupler 1525. A second terminal of the opto-coupler 1525 is connected to a reference voltage so that the terminals of the opto-coupler 1525 can be biased to indicate to the processor circuit whether the water heater 1500 is requesting heat. In particular, when the water heater thermostat is closed, the water heater 1500 is requesting water to the heated. Accordingly, the 120 V AC line coupled directly to one of the terminals of the thermostat can be sensed at the terminal of the opto-coupler 1525. Accordingly, the output of the opto-coupler 1525 provided to the processor circuit can indicate that the water heater 1500 is requesting heating. Furthermore, when the thermostat is open, the 120 V AC signal provided at the other terminal the thermostat is not provided to the first terminal of the opto-coupler 1525, thereby indicating to the processor circuit that the water heater 1500 is not requesting heating.

Figure 16:
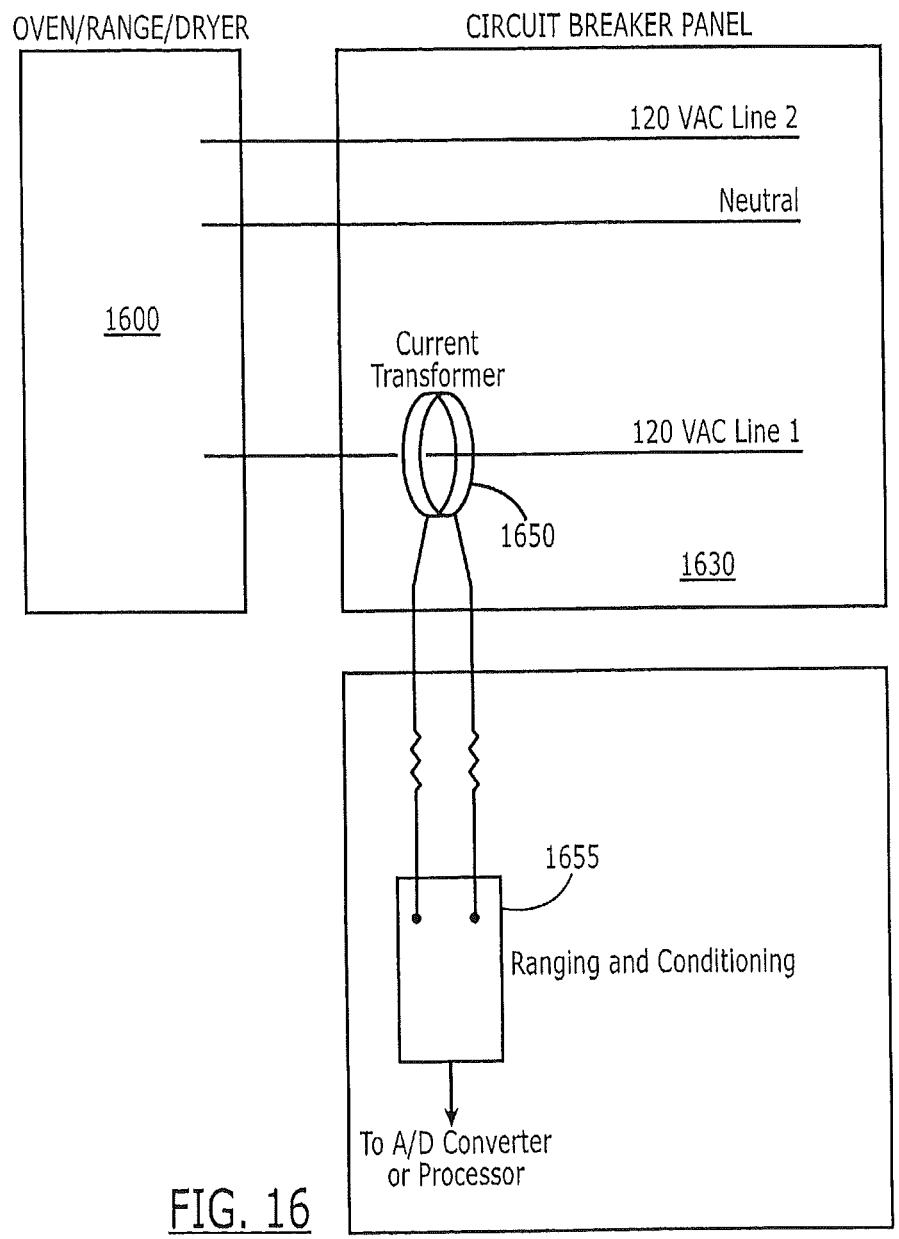
FIG. 16 is a schematic diagram that illustrates circuits and methods for sensing activation/deactivation of, for example, ovens/ranges/dryers in some embodiments according to the invention.

FIG. 16 is a schematic diagram that illustrates methods, circuits, and systems for sensing the operation of electrical appliances in some embodiments according to the invention. According to FIG. 16, an electrical appliance 1600 can be, for example, an electric oven, electric range top, electric dryer, or another type of electrical appliance, which may be unswitched. The electrical appliance 1600 is provided with power via first and second 120 V AC lines and a reference or neutral line from a circuit breaker panel 1630. A current transformer 1650 may be placed in close proximity to the circuit breaker panel 1630 and positioned to sense current flow in one of the 120 V AC lines.

Accordingly, when the electrical appliance 1600 is in operation, the current transformer 1650 can provide a voltage across terminals of a ranging and conditioning circuit 1655, which can provide an output to an analog to digital converter circuit and subsequently to the processor circuit to indicate operation of the electrical appliance 1600. It will be understood that the ranging and conditioning circuit 1655 can operate to change the nature of the voltage signals (e.g., from AC to DC), as well as scale the voltage levels to the appropriate thresholds for the processor circuit, the analog to digital converter circuit, or other circuit which interfaces to the ranging and conditioning circuit 1655.

Operation of the ranging and conditioning circuit 1655 can vary based on which type of electrical appliance 1600 is being monitored. For example, if the electrical appliance 1600 is an electric range top, the ranging and conditioning circuit 1655 may indicate different levels of operation of the electric range top 1600 which may be output as different voltage levels indicating different degrees of operation. For example, a first value provided by the ranging and conditioning circuit 1655 can indicate that only a single burner of the electric range top is activated. In other embodiments according to the invention, other digital outputs can indicate that 2, 3, or more burners of the electric range top are activated. Accordingly, the processor circuit can determine whether to enable/disable other electrical appliances based on the sensed operation of the electric range top.

In some embodiments according to the invention, if the electrical appliance 1600 is an electric dryer, a relay can be electrically coupled to the dryer's heating element so that the processor circuit can take partial control of the electric dryer if desired. For example, if the processor circuit determines that the demand should be reduced, one option would be to temporarily disable or, alternatively, duty cycle the dryer's heating element to reduce peak demand In yet other embodiments according to the invention, generated excess electrical power can be efficiently stored at a customer location, whereas in conventional approaches the generated excess electrical power might be stored inefficiently or even go un-stored. For example, it may be advantageous to maintain the output of an electrical power plant so that it operates at higher efficiency despite the fact that demand for electricity is below the level that is provides for this higher efficiency. The generated excess electrical power provided by this higher efficiency can be stored at a customer location and used later, when demand may be greater. Storing the generated excess electrical power for later use during higher demand periods may reduce the load during the greater demand period so that an existing power plant may more readily meet the demand.

Accordingly, in some embodiments according to the invention, an electrical service provider can maintain control of storage water heaters located at customer locations (e.g., residences and/or businesses) so that generated excess electrical power (i.e., power produced above present demand) can be stored by heating water that may otherwise be heated when demand is higher. For example, the water heaters may be enabled by the electrical service provider during hours when demand for power is less, such as during the night. The heating of the water during the night may reduce the need to heat water during periods of greater demand, thereby storing the excess generated electrical power in the form of hot water.

In some embodiments according to the invention, two or more water heaters may be installed in series at a customer location, such that an output of a first (or storage) water heater is coupled to the input of a second (or primary) water heater, the output of which provides hot water to the customer location. During normal operation, only the primary water heater may actually heat water for use at the customer location. However, during periods of excess capacity, the electrical service provider may enable the storage water heater to store the excess electrical power that is generated by operating the power plant at higher output (which may be more efficient). Later, during hours of greater demand, the electrical service provider may disable the storage water heater used to store the excess capacity, whereas the primary water heater may operate normally. However, during the time of greater demand, the storage water heaters (even though disabled) may provide pre-heated water to the primary water heater, which in-turn, may need to be heated less or perhaps not at all.

In some embodiments according to the invention, the primary water heater in the sequence of water heaters operates without intervention by the electrical service provider. In other words, the final stage of the water heater arrangement may operate under the customer's control, whereas the storage water heater(s) may operate under control of the electrical service provider.

Although the operations described herein illustrate the use of water heaters to store excess capacity produced during lower demand periods, it will be understood that embodiments according to the invention can be utilized to store electrical energy in any form where the excess is generated during periods of reduced demand where higher efficiencies may be provided if the power generation is maintained above demand during the low demand period. Furthermore, it will be understood that the electrical storage devices located at the customer locations, operate responsive to electrical service providers indication that excess capacity exists. Accordingly, the electrical service provider can activate the storage devices located at the customer locations so that the excess electrical power can be stored and utilized later to reduce demand at that customer location.

Furthermore, it will be understood that although the storage water heater used to store the excess generated power is electrically powered, the primary water heater can be powered by a source other than electrical energy, such as gas. Accordingly, the primary water heater can be described as an energy storage device as the water heater can store energy embodied in gas, electrical power, or other source in the form of hot water.

Figure 17:
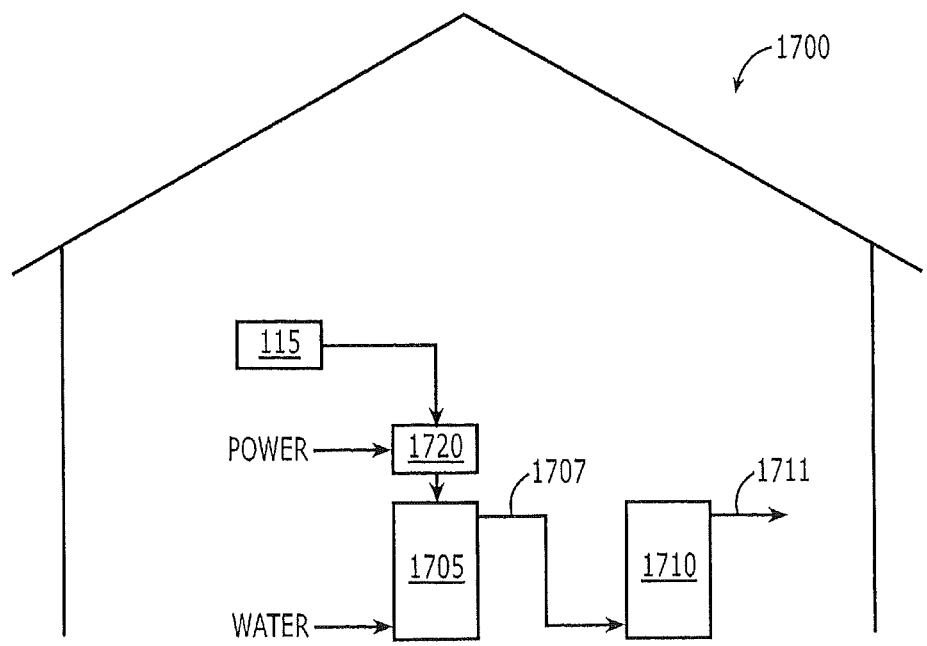
FIG. 17 is a schematic representation of water heaters connected in series in some embodiments according to the invention.

FIG. 17 shows an exemplary embodiment of water heaters at a customer location 1700 where a water heater 1705 operating under control of an electrical service provider is coupled in series to a primary (and potentially pre-existing) water heater 1710 that provides hot water 1711 to the customer location. In operation, the electrical service provider can enable/disable the storage water heater 1705 during times when excess electrical power capacity exists until the storage water heater 1705 reaches capacity, which can be indicated via a thermostat output from the storage water heater 1705.

Accordingly, when the storage water heater 1705 is enabled, the water therein is heated to the temperature indicated by the associated thermostat. Water 1707 heated by the storage water heater 1705 can be provided as an input to the primary water heater 1710. The primary water heater 1710 may heat the water 1707 provided by the storage water heater 1705 very little if the water 1707 has been pre-heated by the storage water heater 1705. Later, when the period of excess capacity has passed, the storage water heater 1705 may be disabled by the electrical service provider, whereupon only the primary water heater 1710 is enabled to heat the water.

However, still referring to FIG. 17, even though the period of excess capacity has passed, the primary water heater 1710 can still receive pre-heated water 1707 from the storage water heater 1705, thereby reducing demand by heating the water 1707 less than would otherwise be needed. When the water in the storage water heater 1705 is depleted, the storage water heater 1705 may simply pass cold water through to the primary water heater 1710, which would heat the water 1707 according to a thermostat associated therewith.

Figure 18:
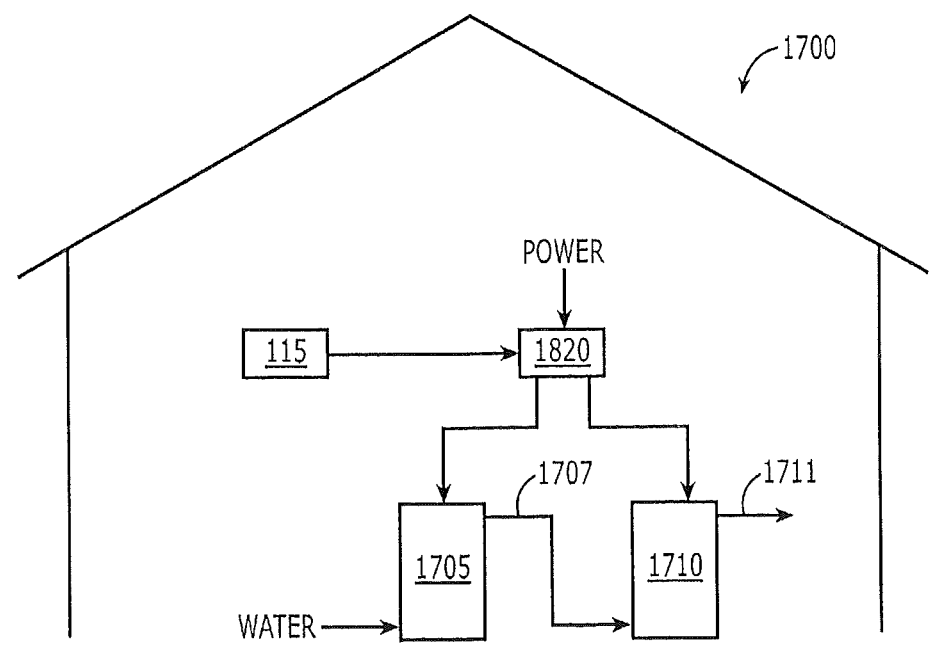
FIGS. 18 and 19 are schematic representations of water heaters coupled in series with one another under the control of power relay circuits in some embodiments according to the invention.
Figure 19:
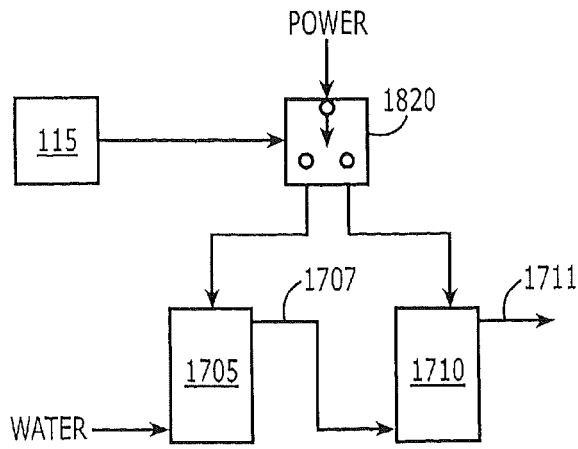

According to FIGS. 18 and 19, in some embodiments according to the invention, the electrical service provider can maintain control (i.e., enable/disable) over the storage water heater 1705 by coupling/de-coupling electrical power to/from the storage water heater 1705, using a power relay circuit 1820 that is responsive to an enable signal provided the processor circuit 200 as shown above, for example, in FIG. 2A. The power relay circuit 1820 can be used to couple/de-couple electrical power to/from the storage water heater 1705 to enable/disable heating of water. Moreover, the power relay circuit 1820 can be used to couple/de-couple electrical power to both the storage water heater 1705 and the primary water heater 1710. Alternatively, the power relay circuit 1820 can be used to toggle power between the storage water heater 1705 and the primary water heater 1710, as shown in FIG. 19.

Relays which control relatively high power electrical appliances (such as a water heaters), can include a low current relay configured to drive a high power relay as shown, for example, in FIG. 18. The low current relay can be connected in series with the higher power relay, which in-turn is configured to couple/decouple electrical power to/from the storage water heater 1705. Moreover, the relay can be operated by the electrical service provider over a network, such as the Internet, connected to an internal network at the customer location including the processor circuit 200.

It will be understood that the electrical service provider can be an electric utility company which owns and operates large scale power generating plants for delivery to the power grid to which the customer location is connected. However, it will be understood that the electrical service provider can be any entity that provides electrical service to the single customer location and is not necessarily limited to those entities that own and operate electrical power generation facilities.

Figure 20:
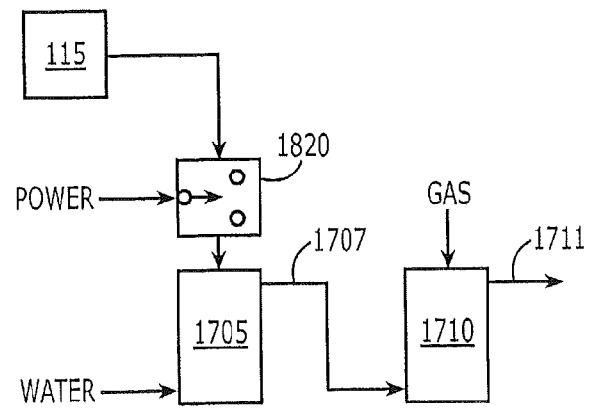
FIG. 20 is a schematic representation of an electric water heater and a gas water heater connected in series with one another where in the electric water heater is operated under control of the electrical service provider.

Furthermore, the electrical service providers may operate in concert with other energy providers, such as natural gas providers, where the primary water heater operates using gas, as shown in FIG. 20. According to FIG. 20, the storage water heater 1705 operates using electricity whereas the primary water heater 1710 operates using gas such that the providers (electric and gas) may coordinate operations of the storage and primary water heaters responsive to, for example, comparative pricing of gas versus electricity, availability of gas versus electric, etc. For example, in some embodiments according to the invention, the providers may determine that, because electricity is less expensive and/or more plentiful, the (electric) storage water heater is enabled to provide hot water to the customer location during periods greater demand for gas. In such embodiments, the gas water heater may still be enabled, but only operate to marginally heat the pre-heated water provided by the (electric) storage water heater. It will be understood that a single provider may provide both the gas and the electrical power in some embodiments according to the invention.

Figure 21:
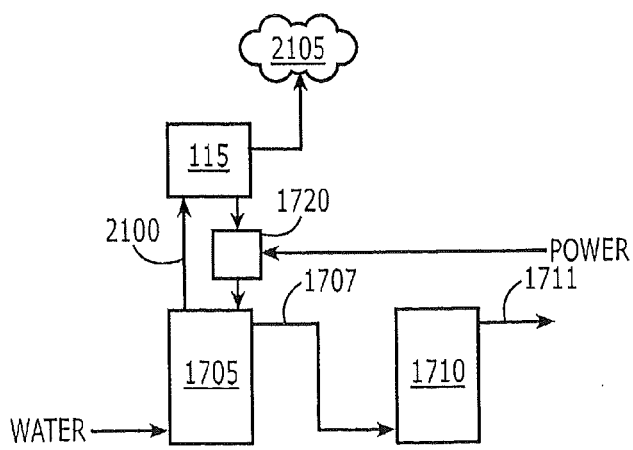
FIG. 21 is a schematic representation of water heaters coupled in series with one another wherein a storage water heater provides an indication of remaining capacity in some embodiments according to the invention.

In some embodiments according to the invention, as shown in FIG. 21, the storage water heater 1705 can provide an indication 2100 to a system 115 (described above in reference to FIG. 2A). It will be understood that the indication 2100 can indicate the state of the water stored in the storage water heater 1705. For example, the indication 2100 can show that the water stored in the storage water heater 1705 has reached a predetermined temperature defined by a thermostat setting for the water heater. In particular, the indication 2100 can be provided by the thermostat within the storage water heater 1705 to show whether the water heater has additional storage capacity. For example, when the water in the water heater 1705 reaches a temperature equal to that indicated by the thermostat setting, the indication 2100 can be provided to the system 115, which can relay the indication to the electrical service provider via the network 2105. The electrical service provider can then disable the storage water heater 1705 via the power relay circuit 1720. Further, the indication 2100 may provide the temperature of the water in the storage water heater 1705, which the electrical service provider may use to determine the remaining capacity of the storage water heater 1705.

When the electrical service provider is provided with the indication 2100, the electrical service provider can manage the plurality of storage water heater 1705 across a number of customer locations. For example, the electrical service provider may disable a first storage water heater 1705 at a first customer location when that storage water heater reaches capacity, and may activate a second storage water heater 1705 at a second customer location to equalize the demand for the capacity provided by the electrical service provider.

Later, for example when water is used at the customer location, cold water may flow into the first storage water heater 1705, thereby reducing the temperature of the water therein. The reduction in temperature can be shown via the indication 2100, which is relayed to the electrical service provider. In response, the service provider can note that the first storage water heater 1705 now has additional storage capacity, which can be utilized by enabling the first storage water heater 1705 when additional demand is needed.

Figure 22:
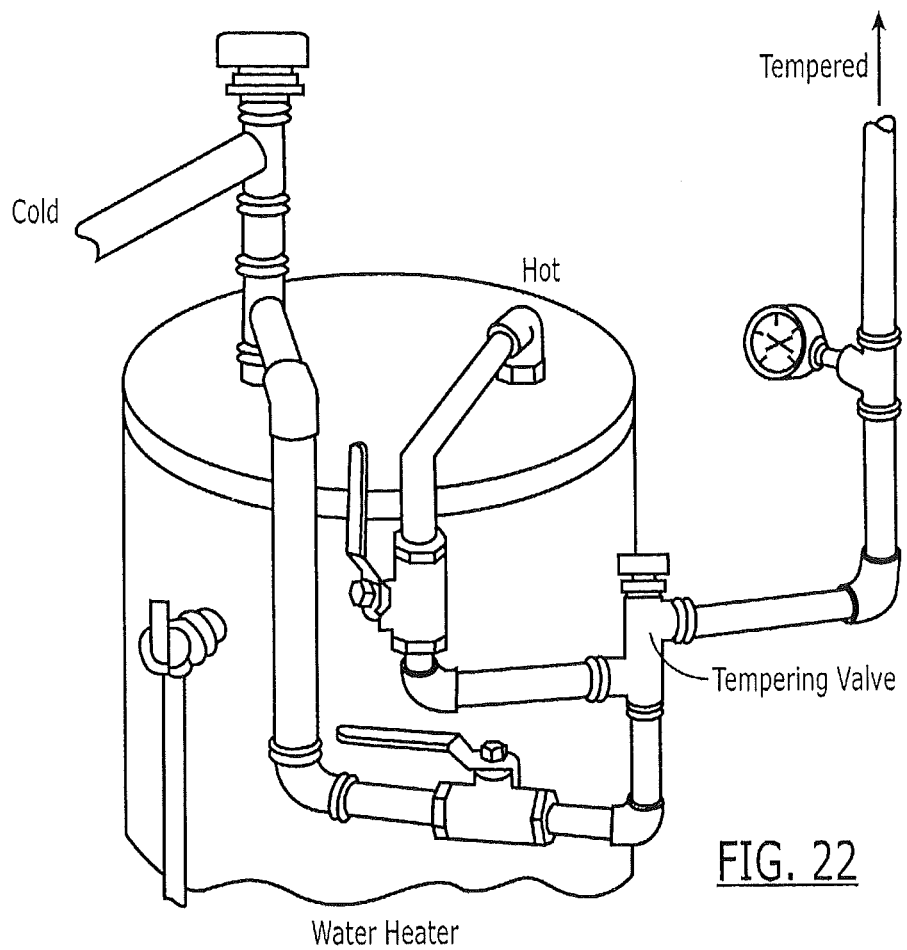
FIG. 22 is a schematic representation of a water heater having a tempering valve configuration in some embodiments according to the invention.

In still further embodiments according to the invention, the storage water heater 1705 can utilize a configuration such as that shown in FIG. 22 to insure that the water 1707 provided by the storage water heater 1705 is not so hot that it provides a risk of scalding to users of the primary water heater 1710. According to FIG. 22, cold water provided at the input of storage water heater 1707 can be mixed with heated water 1707 provided at the output thereof to the input of the primary water heater 1710. Accordingly, the cold water mixed with the heated water can reduce the temperature of the water provided to the primary water heater 1710, which may be ultimately used at the customer location.

As described above, a storage device at the customer location can be remotely enabled in response to determining whether excess electrical capacity exists and, therefore, the demand at the associated customer location can be increased to store the excess electrical capacity. Moreover, the availability of the generated electricity can include the availability of excess generated electricity that exceeds demand. For example, the generated electricity can be electricity that is generated by a wind or solar farm, the nature of which is transient. In particular, wind farms generate electricity based on prevailing winds whereas solar farms generate electricity during daylight and, further, depend on relatively clear atmospheric condition. Accordingly, wind and solar farms can generate more electricity during some times compared to others.

Figure 23:
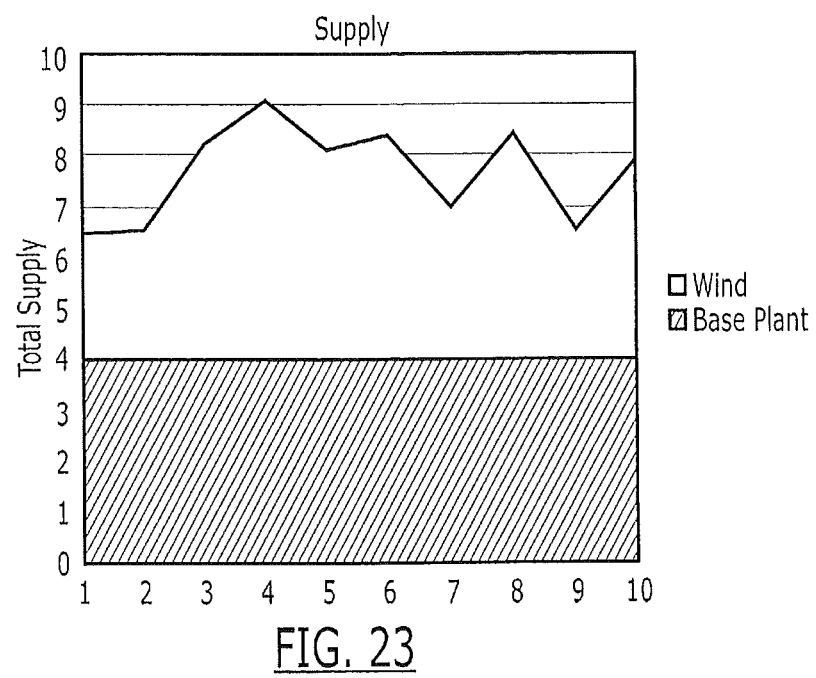
FIG. 23 is a graphical representation of the generation of a "base" amount of electrical power in some embodiments according to the invention.

For example, in some systems utilizing embodiments according to the invention, a conventional power plant (such as a nuclear power plant) generates a "base" amount of electrical power, which is shown as the base portion of the graph in FIG. 23. It will be understood that a wind farm can generate electricity based on the prevailing winds located at the farm. Accordingly, the wind farm can produce electrical power on a transient basis based on the wind available, so that the electrical power generated by the wind farm varies while the output of the conventional power plant (i.e., the base) can remain static. However, the electrical power generated by the base power plant and the wind farm can be combined to produce a total electrical power capacity which varies over time based on the prevailing wind available to the wind farm as shown in FIG. 23.

Figure 24:
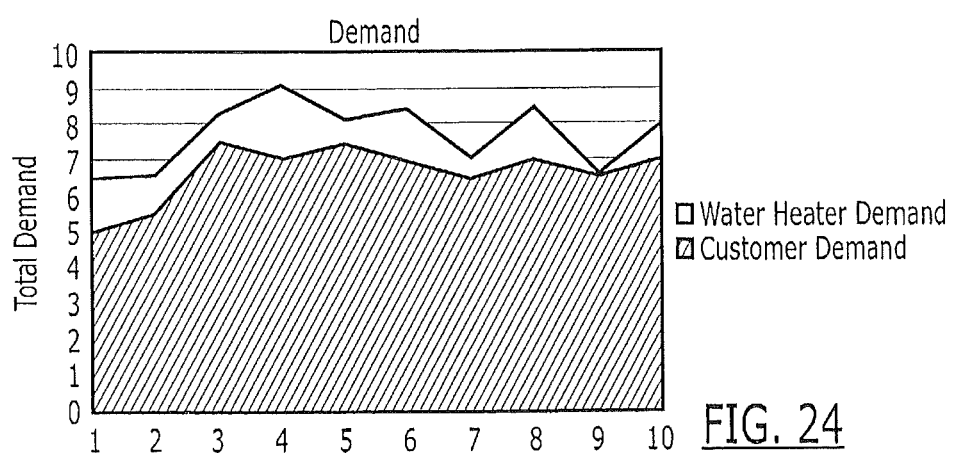
FIG. 24 is a graphical representation of aggregate demand adjusted to approximate the total electrical supply shown in FIG. 23 by selectively enabling/disabling water heaters at customer locations as the total electrical supply shown in FIG. 24 varies in some embodiments according to the invention.

As shown by the graph in FIG. 24, aggregate demand can be adjusted to approximate the total electrical supply shown in FIG. 23 by selectively enabling/disabling water heaters at customer locations as the total electrical supply shown in FIG. 24 varies. In particular, FIG. 24 shows that water heaters at customer locations can be enabled so that the customer demand added to the remotely enabled demand can approximate the total electrical supply shown in FIG. 23.

The table in FIG. 25 shows exemplary electrical power that can be generated by the wind farm at different times. Moreover, the excess electrical power generated by the wind farm varies as the wind varies over the time intervals 1-10 shown in FIG. 25. For example, at Time 1 the conventional power plant generates a static output of 4, whereas the wind farm can generate excess electrical power of 1.8 to provide a total electric supply of 5.8.

As shown in FIG. 26, at Time 1 the demand for electricity may be equal to 5 so that 0.8 of excess capacity (i.e., the conventional power plant output added to the wind farm output at Time 1 shown in Table 1) exists. Accordingly, a number of water heaters at the customer locations can be selectively enabled to approximate the total electrical supply available. In other words, enough water heaters can be enabled to store the excess electrical power generated by the combined output of the conventional plant and the wind farm. As shown in FIG. 26, at Time 1, it is estimated that 1848 water heaters can be selectively enabled to store the excess electrical power that exceeds the demand (i.e., 0.8).

It will be further understood that the water heaters may also be selectively disabled as the total electrical supply decreases. For example, as shown in FIG. 23, at Time 4, the total electrical supply available from the conventional plant and the wind farm is at peak output, but later drops at Time 5. Accordingly, at Time 4, 5308 water heaters may be selectively enabled to store the excess total electrical supply, whereas at Time 5, only 1311 water heaters are enabled. Accordingly, approximately 4000 water heaters can be disabled when transitioning from Time 4 to Time 5.

In further embodiments according to the invention, water heaters can be remotely enabled to more readily maintain a balance between supply and demand for electricity. In particular, a marginal number of water heaters may be remotely enabled to store excess electrical capacity so that the demand associated with the marginal water heaters can be more readily adjusted as total demand changes. For example, a number of marginal water heaters may be enabled to bring demand above the capacity of a base power plant coupled with relatively coarse following power plants. However, the increased demand associated with the marginal water heaters may not require additional relatively fine following power plants to be brought on-line.

As shown in FIG. 27, in some exemplary embodiments according to the invention, 100,000 water heaters may be remotely enabled as a nominal operating condition so that demand may be adjusted to more readily match supply provided by the base power plant output coupled with output from wind farms and following power plants (relatively small and in-efficient power plants that can be brought on/offline more easily than the base power plants). For example, if actual consumer demand decreases while 100,000 water heaters are enabled, an additional 4,434 water heaters can be enabled to absorb the excess capacity so that the plant outputs can be maintained (at time 1). In comparison, at time 2, actual demand increases so that 72,504 water heaters are disabled so that the associated capacity can be provided to meet the actual demand while maintaining the same plant outputs.

In this way, the total number of water heaters that are enabled can be used as a quiescent operating point about which the demand in adjusted or "trimmed." For example, if about 1 million water heaters are available for remotely enabling/disabling, about 200 megawatts of supply/demand variance can be adjusted for (or "smoothed") by enabling/disabling (i.e., trimming) of a marginal number of water heaters. In some embodiments according to the invention, this estimate is based on an average water heater having a capacity of 60 gallons receiving water at a temperature of 60 degrees Fahrenheit and producing water at a temperature of 125 degrees Fahrenheit, which is estimated to consume about 9.54 kW/hr/day. Scaling this estimate up assuming the availability of 1 million water heaters would provide smoothing of about 200 mW in supply/demand variance.

Figure 28:
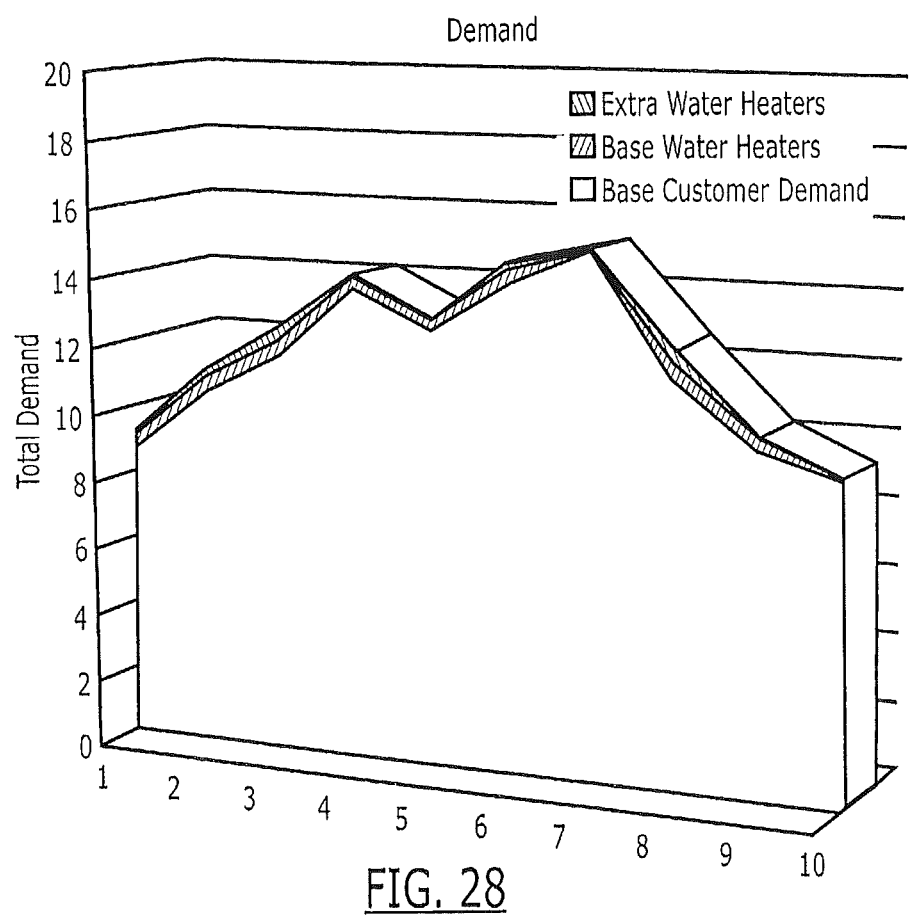
FIG. 28 is a graphical representation of the number of enabled water heaters changed (relative to a nominally enabled number) to either increase or lower demand to more smoothly meet capacity in some embodiments according to the invention.

Referring again to FIG. 27, the table illustrates an exemplary embodiment according to the invention, where 100,000 water heaters are nominally enabled. In particular, FIG. 27 shows a randomized customer demand over time T1-T10 to show trimming the number of enabled water heaters in response to actual demand variation over time. For example at time T1, the randomized customer demand is below a nominal demand value so that an additional 4,434 water heaters are enabled to store the otherwise unused excess capacity. Further, at time T2, the randomized customer demand increases above the nominal demand so that enabled water heater are disabled, so that only 72,504 water heaters are enabled, which is less than the nominally enabled 100,000 water heaters. In other words, water heaters are trimmed from the demand to allow power delivery to the actual customer demand. These examples show how the number of enabled water heaters can be changed (relative to a nominally enabled number) to either increase or lower demand to more smoothly meet capacity, which is also illustrated in FIG. 28.

In other words, additional water heaters can be enabled relatively quickly to absorb additional capacity, whereas unneeded water heaters can be disabled when less demand is to be absorbed (such as when actual consumer demand increases). This approach may avoid the need to operate relatively expensive fine following power plants (i.e., power plants which provide relatively small marginal power output in response to increased demand that are relatively inefficient). Stated differently, the marginal water heaters may be used as the fine following power plants, rather than the relatively expensive and inefficient conventional approach that uses, for example, gas turbine power plants as the fine following power plants.

As described above, an electrical service provider can maintain control of storage water heaters located at customer locations (e.g., residences and/or businesses) so that generated excess electrical power (i.e., power produced above demand) can be stored by heating water that would otherwise be heated when demand is higher. For example, the water heaters may be enabled by the electrical service provider during hours when demand for power is less, such as during the night. The heating of the water during the night may reduce the need to heat water during periods of greater demand, thereby storing the excess generated electrical power in the form of hot water.

It will be understood that the energy storage devices (such as the water heaters) described herein can be enabled/disabled for the purposes of balancing demand and capacity as discussed above in reference to FIGS. 17-21. For example, the electrical service provider (or other organization) can enable/disable the water heaters at customer location via respective networks, such as the Internet, connected to an internal network at the customer locations. Further, the respective networks at the customer locations may be coupled to a system such as that described above in reference to FIG. 2A including the processor circuit 200, which can operate water heaters via the relay configurations shown in the figures.

Figure 29:
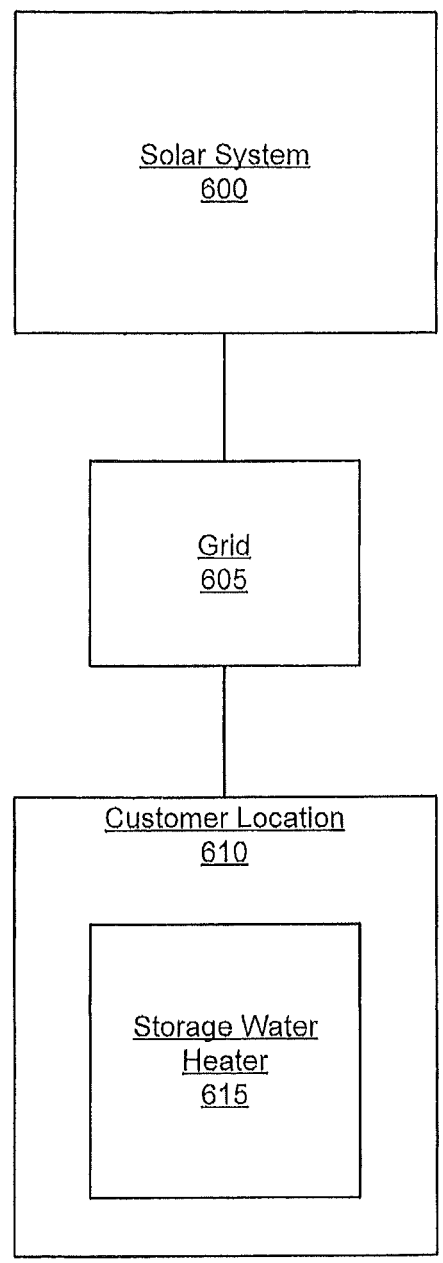
FIG. 29 is a schematic diagram that illustrates a solar electrical system supplying electricity to a customer location via an electrical grid in some embodiments according to the invention.

In still further embodiments according to the invention, any of the embodiments described herein can include a connection to solar generated electrical power as shown in FIG. 29. In particular, solar generated electrical power provided by a system 600 can be connected to a grid 605. The grid 605 is also connected to a plurality of customer locations which include the energy storage devices (such as water heaters) configured to operate as described in other embodiments herein. Accordingly, as solar generated electrical power is provided to the grid, the solar power can be used in analogous fashion to that described above in reference to wind farms or other types of transient power sources. For example, the electrical power provided by the system 600 can be provided on a transient basis due to solar activity that provides the basis for the power provided by the system 600. As the solar generated electrical power is generated by the system 600, it can be stored by remotely enabling the storage water heater 615 located in the customer location 610 so that electrical power may be unnecessary to heat water at the customer location at a later time.

Furthermore, connecting the system 600 to the customer location 610 via the grid 605 can allow the system 600 (such as solar panels) to be located at places other than the customer location 610. In particular, in conventional approaches, solar panels are located at the customer location and may be limited to providing electrical power to the specific customer location 610. However, in some embodiments according to the invention as described above, the solar panels can be located remote from the customer location 610 and in some embodiments, be located in entirely different regions but still connected to the customer location 600 by the grid 605. Accordingly, such embodiments can be used to store the transient electrical power generated by the system 600, as well as used to trim the demand as described above in reference to, for example, FIG. 28. In still other embodiments according to the invention, the solar system may be used as another power source to follow demand or for "trimming."

In still further embodiments according to the invention, an electrical vehicle that includes an energy storage device, such as an electrical battery, can be remotely selectively charged at a customer location in response to the availability of generated electricity. For example, when excess electrical power is available from a provider the charging of the battery can be remotely enabled in response to the availability of the excess power so that the provider may more effectively balance demand against the supply of electricity. Alternatively, charging of the battery may be remotely selectively disabled when the availability of the excess power is reduced or when demand has shifted to other regions and, therefore, can be increased in the other region whereas the demand in the region associated with the electric vehicle is reduced by disabling charging of the battery.

In the specification, there have been disclosed embodiments of the invention and, although specific terms are employed, they are used in a generic and descriptive sense only and not for purposes of limitation. The following claims are provided to ensure that the present application meets all statutory requirements as a priority application in all jurisdictions and shall not be construed as setting forth the scope of the present invention.

What is claimed:

1. A method of managing excess electrical power generation comprising:
remotely controlling operation of at least one of two energy storage devices coupled in series at a customer location in response to availability of generated electricity to the customer location, wherein each energy storage device comprises a water heating device.

2. A method according to claim 1 wherein the availability of generated electricity comprises the availability of excess generated electricity exceeding demand.

3. A method according to claim 1 wherein the availability of generated electricity comprises a cost associated with the generated electricity compared to a cost associated with gas.

4. A method according to claim 1 wherein the at least one of two energy storage devices comprise a first water heater having an output thereof to provide pre-heated water to an input of a second water heater.

5. A method according to claim 1 wherein remotely controlling operation of the at least one of the two energy storage devices coupled in series at the customer location in response to the availability of the generated electricity comprises enabling the at least one of the two energy storage devices in response to determining that excess electrical capacity exists to increase demand associated with the customer location.

6. A method according to claim 5 wherein remotely controlling operation comprises enabling a first water heating device to be activated when excess electrical power generation capacity exists to store excess electrical power at the customer location as pre-heated water for a second water heating device.

7. A method according to claim 6 wherein the first water heating device is configured to heat water responsive to a thermostat associated therewith when activated.

8. A method according to claim 6 wherein enabling the first water heating device to be activated when excess electrical power generation capacity exists comprises transmitting an activation signal from a system operated by an electric service provider over a network to a power relay at the customer location to couple the first water heating device to electrical power.

9. A method according to claim 4 wherein the second water heater further heats the pre-heated water provided by the first water heater responsive to a thermostat associated therewith.

10. A method according to claim 1 wherein each energy storage device comprises a water heater.

11. A method according to claim 1 wherein each of the energy storage devices comprises respective portions of a water heater.

12. A method according to claim 11 wherein the respective portions each include a respective one of the water heating devices configured to heat water associated with the respective portion.

13. A method according to claim 12 wherein each of the water heating devices comprises a water heater element.

14. A method according to claim 1 wherein each of the water heating devices comprises a water heater element.

15. A method according to claim 13 wherein the water heater elements comprise two or more water heater elements each being associated with a respective portion of the water heater.

16. A method according to claim 15 wherein ones of the water heater elements are configured to pre-heat water in the respective portion for other portions of the water heater.

17. A method according to claim 16 wherein the water heater elements comprise three water heater elements each being associated with a respective portion of the water heater.

18. A method according to claim 1 wherein remotely controlling operation comprises enabling a first water heating device to store excess electrical power at the customer location as pre-heated water for use by a second water heating device.

19. A computer program product for managing excess electrical power generation comprising:
a non-transitory computer readable storage medium having computer readable program code embodied in the medium, the computer readable program code when executed by a processor causing the processor to perform operations comprising:
remotely controlling operation of at least one of two energy storage devices coupled in series at a customer location in response to availability of generated electricity to the customer location, wherein the energy storage devices comprise water heating devices.

20. A computer program product according to claim 19 wherein at least one of the energy storage devices comprises a first water heater having an output thereof to provide pre-heated water to an input of a second water heater.

21. A computer program product according to claim 19 wherein remotely controlling operation comprises enabling a first water heating device to store excess electrical power at the customer location as pre-heated water for heating by a second water heating device.

22. A computer program product according to claim 19 wherein each of the energy storage devices comprises a respective portion of a water heater.

23. A computer program product according to claim 22 wherein each of the respective portions include a respective one of the water heating devices configured to heat water associated with the respective portion.

24. A computer program product according to claim 23 wherein each of the water heating devices comprises a respective water heater element.

25. A computer program product according to claim 24 wherein the water heater devices comprise two or more water heater elements each being associated with a respective portion of the water heater.

26. A computer program product according to claim 25 wherein the ones of the water heater elements are configured to pre-heat water in the respective portion for other portions of the water heater.

* * * * *